United States Patent
Agrawal et al.

(10) Patent No.: US 12,160,683 B2
(45) Date of Patent: Dec. 3, 2024

(54) PERSONAL CONTENT MANAGED DURING EXTENDED DISPLAY SCREEN RECORDING

(71) Applicant: Motorola Mobility LLC, Chicago, IL (US)

(72) Inventors: Amit Kumar Agrawal, Bangalore (IN); Gautham Prabhakar Natakala, Bangalore (IN); Shuang Wu, Shenzhen (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/985,549

(22) Filed: Nov. 11, 2022

(65) Prior Publication Data

US 2023/0069486 A1    Mar. 2, 2023

Related U.S. Application Data

(63) Continuation of application No. 17/154,677, filed on Jan. 21, 2021, now Pat. No. 11,509,857.

(30) Foreign Application Priority Data

Dec. 29, 2020   (CN) .......................... 202011603816.5

(51) Int. Cl.
  *H04N 5/92*   (2006.01)
  *G06T 5/20*   (2006.01)
  *G10L 25/57*   (2013.01)

(52) U.S. Cl.
  CPC ................. *H04N 5/92* (2013.01); *G06T 5/20* (2013.01); *G10L 25/57* (2013.01)

(58) Field of Classification Search
  CPC ... H04N 5/92; H04N 5/77; G06T 5/20; G06T 11/00; G10L 25/57; G06F 21/6245;
  (Continued)

(56) References Cited

U.S. PATENT DOCUMENTS 8,191,152 B1    5/2012    Barker et al.
8,887,306 B1   11/2014    Palacio
(Continued)

OTHER PUBLICATIONS

"Non-Final Office Action", U.S. Appl. No. 17/184,912, filed Jan. 5, 2022, 14 pages.
(Continued)

*Primary Examiner* — Michael E Teitelbaum
(74) *Attorney, Agent, or Firm* — FIG. 1 Patents

(57) ABSTRACT

In aspects of personal content managed during extended display screen recording, a screen recording system includes a wireless device that provides digital image content for display on an extended display device, and a screen recording session on the wireless device captures the digital image content and audio data. The wireless device implements a content control module that can determine the screen recording session would capture personal content associated with a user of the wireless device. The content control module can initiate a private screen review mode in which the personal content is displayable on a display screen of the wireless device and is prevented from visual display on the extended display device. The content control module can also generate a shareable screen recording that includes the audio data and the digital image content displayed on the extended display device, without including the personal content.

20 Claims, 11 Drawing Sheets

(58) Field of Classification Search
CPC ........ G06F 21/84; G06F 3/1423; G06F 9/542; G11B 27/34
See application file for complete search history.

(56) References Cited

U.S. PATENT DOCUMENTS

| | | |
|---|---|---|
| 9,424,668 B1 | 8/2016 | Petrou et al. |
| 9,750,420 B1 | 9/2017 | Agrawal et al. |
| 9,936,066 B1 | 4/2018 | Mammen et al. |
| 11,019,106 B1 | 5/2021 | Harvell |
| 11,323,653 B1 | 5/2022 | Voss |
| 11,509,857 B2 | 11/2022 | Agrawal et al. |
| 11,930,240 B2 | 3/2024 | Agrawal |
| 11,947,702 B2 | 4/2024 | Agrawal et al. |
| 11,979,682 B2 | 5/2024 | Agrawal et al. |
| 12,058,474 B2 | 8/2024 | Agrawal et al. |
| 12,114,097 B2 | 10/2024 | Agrawal et al. |
| 2008/0068343 A1 | 3/2008 | Hoshino et al. |
| 2008/0155538 A1 | 6/2008 | Pappas |
| 2008/0194333 A1 | 8/2008 | Zalewski |
| 2008/0309762 A1 | 12/2008 | Howard et al. |
| 2009/0317063 A1 | 12/2009 | Adachihara et al. |
| 2013/0016115 A1 | 1/2013 | Minert et al. |
| 2014/0108943 A1 | 4/2014 | Lee et al. |
| 2014/0109063 A1 | 4/2014 | Schissel et al. |
| 2014/0188802 A1 | 7/2014 | Branton et al. |
| 2014/0240440 A1 | 8/2014 | Seo et al. |
| 2014/0250227 A1 | 9/2014 | Slovacek |
| 2014/0359493 A1 | 12/2014 | Hong et al. |
| 2014/0375750 A1 | 12/2014 | Yoshida |
| 2015/0242104 A1 | 8/2015 | Stokman et al. |
| 2015/0281436 A1 | 10/2015 | Kumar et al. |
| 2015/0281445 A1 | 10/2015 | Kumar et al. |
| 2015/0367238 A1 | 12/2015 | Perrin et al. |
| 2015/0378577 A1 | 12/2015 | Lum et al. |
| 2016/0006797 A1 | 1/2016 | Aoki et al. |
| 2016/0072861 A1 | 3/2016 | Woolsey et al. |
| 2016/0205340 A1 | 7/2016 | Jang et al. |
| 2016/0277808 A1 | 9/2016 | Yu et al. |
| 2016/0306514 A1 | 10/2016 | McKeithan, II |
| 2016/0360256 A1 | 12/2016 | Van Os et al. |
| 2017/0046279 A1 | 2/2017 | Song et al. |
| 2017/0048380 A1 | 2/2017 | Ito et al. |
| 2017/0068829 A1 | 3/2017 | Shaw et al. |
| 2017/0104893 A1 | 4/2017 | Hardy et al. |
| 2017/0164146 A1 | 6/2017 | Coppert |
| 2017/0238026 A1 | 8/2017 | Agrawal |
| 2017/0240440 A1 | 8/2017 | Shao |
| 2017/0243013 A1 | 8/2017 | Herlocher et al. |
| 2017/0262136 A1 | 9/2017 | Raghavan et al. |
| 2017/0269809 A1 | 9/2017 | Qian |
| 2017/0269895 A1 | 9/2017 | Gates et al. |
| 2017/0269976 A1 | 9/2017 | Venkataraman et al. |
| 2017/0289267 A1 | 10/2017 | Eschbach et al. |
| 2018/0046341 A1 | 2/2018 | Lee et al. |
| 2018/0130496 A1 | 5/2018 | Mahapatra et al. |
| 2018/0315428 A1 | 11/2018 | Johnson et al. |
| 2019/0037173 A1 | 1/2019 | Lee et al. |
| 2019/0073490 A1 | 3/2019 | Agrawal et al. |
| 2019/0306310 A1 | 10/2019 | Saito et al. |
| 2019/0369952 A1 | 12/2019 | Little |
| 2020/0050983 A1 | 2/2020 | Balasuramanian et al. |
| 2020/0143821 A1 | 5/2020 | Johnson, Jr. et al. |
| 2020/0219023 A1 | 7/2020 | Duchastel |
| 2021/0012026 A1* | 1/2021 | Taylor ............... G06N 20/00 |
| 2021/0012036 A1 | 1/2021 | Franzo |
| 2021/0064880 A1 | 3/2021 | Zhang et al. |
| 2021/0069550 A1 | 3/2021 | Clark et al. |
| 2021/0133334 A1 | 5/2021 | Ji et al. |
| 2021/0133459 A1* | 5/2021 | Wang ............... H04N 21/4884 |
| 2021/0192223 A1 | 6/2021 | Williams et al. |
| 2021/0200501 A1 | 7/2021 | Stankoulov |
| 2021/0243233 A1 | 8/2021 | Singh et al. |
| 2021/0243418 A1 | 8/2021 | Ojala |
| 2021/0263968 A1 | 8/2021 | Zade et al. |
| 2021/0353209 A1 | 11/2021 | Gossens et al. |
| 2022/0138345 A1 | 5/2022 | Krishnan et al. |
| 2022/0150571 A1 | 5/2022 | Agrawa |
| 2022/0161145 A1 | 5/2022 | Hardee et al. |
| 2022/0206645 A1 | 6/2022 | Zadina et al. |
| 2022/0207175 A1 | 6/2022 | Agrawal et al. |
| 2022/0210365 A1 | 6/2022 | Agrawal et al. |
| 2022/0256111 A1 | 8/2022 | Agrawal et al. |
| 2023/0239426 A1 | 7/2023 | Agrawal et al. |
| 2023/0239427 A1 | 7/2023 | Agrawal et al. |

OTHER PUBLICATIONS

U.S. Appl. No. 17/095,363, , "Non-Final Office Action", U.S. Appl. No. 17/095,363, filed Jan. 20, 2023, 14 pages.
U.S. Appl. No. 17/095,363, , "Non-Final Office Action", U.S. Appl. No. 17/095,363, filed Jan. 20, 2023, 9 pages.
U.S. Appl. No. 17/154,628, , "Final Office Action", U.S. Appl. No. 17/154,628, filed Jan. 26, 2023, 22 pages.
U.S. Appl. No. 17/154,628, , "Non-Final Office Action", U.S. Appl. No. 17/154,628, filed Aug. 5, 2022, 19 pages.
U.S. Appl. No. 17/154,677, , "Non-Final Office Action", U.S. Appl. No. 17/154,677, filed Jul. 19, 2022, 11 pages.
U.S. Appl. No. 17/154,677, , "Notice of Allowance", U.S. Appl. No. 17/154,677, filed Oct. 5, 2022, 5 pages.
U.S. Appl. No. 17/154,677, , "Supplemental Notice of Allowability", U.S. Appl. No. 17/154,677, filed Oct. 13, 2022, 3 pages.
U.S. Appl. No. 17/184,912, , "Final Office Action", U.S. Appl. No. 17/184,912, filed Oct. 7, 2022, 24 pages.
U.S. Appl. No. 17/095,363 , "Final Office Action", U.S. Appl. No. 17/095,363, filed Jun. 22, 2023, 10 pages.
U.S. Appl. No. 17/184,912 , "Non-Final Office Action", U.S. Appl. No. 17/184,912, filed May 25, 2023, 19 pages.
U.S. Appl. No. 18/190,227 , "Non-Final Office Action", U.S. Appl. No. 18/190,227, filed Jul. 17, 2023, 12 pages.
U.S. Appl. No. 18/190,263 , "Non-Final Office Action", U.S. Appl. No. 18/190,263, filed Jul. 17, 2023, 12 pages.
U.S. Appl. No. 17/095,363 , "Advisory Action", U.S. Appl. No. 17/095,363, filed Sep. 13, 2023, 3 pages.
U.S. Appl. No. 17/095,363 , "Non-Final Office Action", U.S. Appl. No. 17/095,363, filed Oct. 25, 2023, 9 pages.
U.S. Appl. No. 17/154,628 , "Corrected Notice of Allowability", U.S. Appl. No. 17/154,628, filed Nov. 3, 2023, 3 pages.
U.S. Appl. No. 17/154,628 , "Notice of Allowance", U.S. Appl. No. 17/154,628, filed Oct. 4, 2023, 8 pages.
U.S. Appl. No. 17/095,363 , "Notice of Allowability", U.S. Appl. No. 17/095,363, filed Jan. 19, 2024, 4 pages.
U.S. Appl. No. 17/095,363 , "Notice of Allowance", U.S. Appl. No. 17/095,363, filed Jan. 8, 2024, 7 pages.
U.S. Appl. No. 17/154,628 , "Corrected Notice of Allowability", U.S. Appl. No. 17/154,628, filed Dec. 12, 2023, 2 pages.
U.S. Appl. No. 18/190,227 , "Final Office Action", U.S. Appl. No. 18/190,227, filed Dec. 28, 2023, 14 pages.
U.S. Appl. No. 18/190,263 , "Corrected Notice of Allowability", U.S. Appl. No. 18/190,263, filed Jan. 19, 2024, 2 pages.
U.S. Appl. No. 18/190,263 , "Notice of Allowance", U.S. Appl. No. 18/190,263, filed Jan. 5, 2024, 5 pages.
U.S. Appl. No. 17/184,912 , "Corrected Notice of Allowability", U.S. Appl. No. 17/184,912, filed May 3, 2024, 2 pages.
U.S. Appl. No. 17/184,912 , "Notice of Allowability", U.S. Appl. No. 17/184,912, filed Mar. 19, 2024, 9 pages.
U.S. Appl. No. 18/190,263 , "Supplemental Notice of Allowability", U.S. Appl. No. 18/190,263, filed Apr. 4, 2024, 2 pages.
U.S. Appl. No. 17/184,912, "Corrected Notice of Allowability", U.S. Appl. No. 17/184,912, Jul. 3, 2024, 2 pages.
U.S. Appl. No. 18/190,227, "Notice of Allowance", U.S. Appl. No. 18/190,227, Jul. 31, 2024, 5 pages.
U.S. Appl. No. 18/190,227, "Supplemental Notice of Allowability", U.S. Appl. No. 18/190,227, Sep. 10, 2024, 3 pages.

* cited by examiner

PERSONAL CONTENT MANAGED DURING EXTENDED DISPLAY SCREEN RECORDING

RELATED APPLICATIONS

This application is a continuation of and claims priority to U.S. patent application Ser. No. 17/154,677 filed 21 Jan. 2021, entitled "Personal Content Managed during Extended Display Screen Recording", the entire disclosure of which is incorporated by reference herein in its entirety. The U.S. patent application Ser. No. 17/154,677 claims the priority benefit of China Patent Application for Invention Serial No. 202011603816.5 filed 29 Dec. 2020, entitled "Personal Content Managed during Extended Display Screen Recording", the disclosure of which is incorporated by reference herein in its entirety.

BACKGROUND

Devices such as smart devices, mobile devices (e.g., cellular phones, tablet devices, smartphones), consumer electronics, and the like have become increasingly commonplace to many device users. For example, one person may have a laptop computer, a desktop computer, a tablet device, a mobile phone, and so forth. Furthermore, these different devices may have different operating systems and can run numerous different types of applications. While the variety of devices and applications provides users with a large number of options, it can also be difficult for users to learn how to use the various different devices and applications. Accordingly, a user who is wanting to learn an aspect of device operation or function, or learn an application feature, such as for a personal or business task, for entertainment, or to conquer a gaming level, may seek to find a recorded example via any number of the available social media platforms. Often, other users who are proficient with a particular device operation or software application feature will perform the device operation, or run through the application feature, while screen recording their own device, thus capturing an instruction tutorial with audio and/or video, which can then be shared on any number of the social media platforms for access by others.

A screen recording feature may be included as a device function in many of the different types of devices, and can be initiated by a user who is operating a device to capture a sequence of device inputs and operations, application features, and resulting displayed outputs. A user may initiate a screen recording session on a device in any number of various scenarios, such as a prolific gamer recording his or her game play for sharing with fan followers, or as noted above, to create an instruction tutorial for others. Alternatively, a person who reviews and evaluates new consumer devices may initiate a screen recording session to capture and share new device functionality for an online audience. Similarly, a technical and/or quality assurance reviewer may initiate a screen recording session to capture and report a device operation function or feature.

The screen recording feature obviates the need for assistance from another person holding a separate device and recording a video of the user who is operating his or her own device to demonstrate a sequence of device inputs and operations, application features, and resulting displayed outputs. The screen recording feature also provides for convenient content generation and sharing from the single device itself. While the screen recording feature offers several benefits to the user of a device, the screen recording feature is not without problems that may be encountered, particularly while a screen recording session is initiated and recording on a device.

For example, it is quite likely that a user will receive some type of a notification that displays on the display screen of the device during a screen recording session, such as a pop-up notification that indicates an alarm, having received a text message or a new email message, a notification of an incoming video call or phone call, or any other type of a banner notice of a received communication. The notification that displays automatically on the display screen of the device will then be recorded as part of the screen recording session, and will be shared publicly when the recording is posted to any number of the social media platforms. Unfortunately, this can lead to personal content (also referred to as "personally identifiable information") of the user being publicly disclosed in the form of audio and/or video content, such as user contact details, photos, login credentials, financial transaction details, biometric information, etc. that is private and sensitive data of the user.

BRIEF DESCRIPTION OF THE DRAWINGS

Implementations of the techniques for personal content managed during screen recording are described with reference to the following Figures. The same numbers may be used throughout to reference like features and components shown in the Figures.

DETAILED DESCRIPTION

Figure 1:
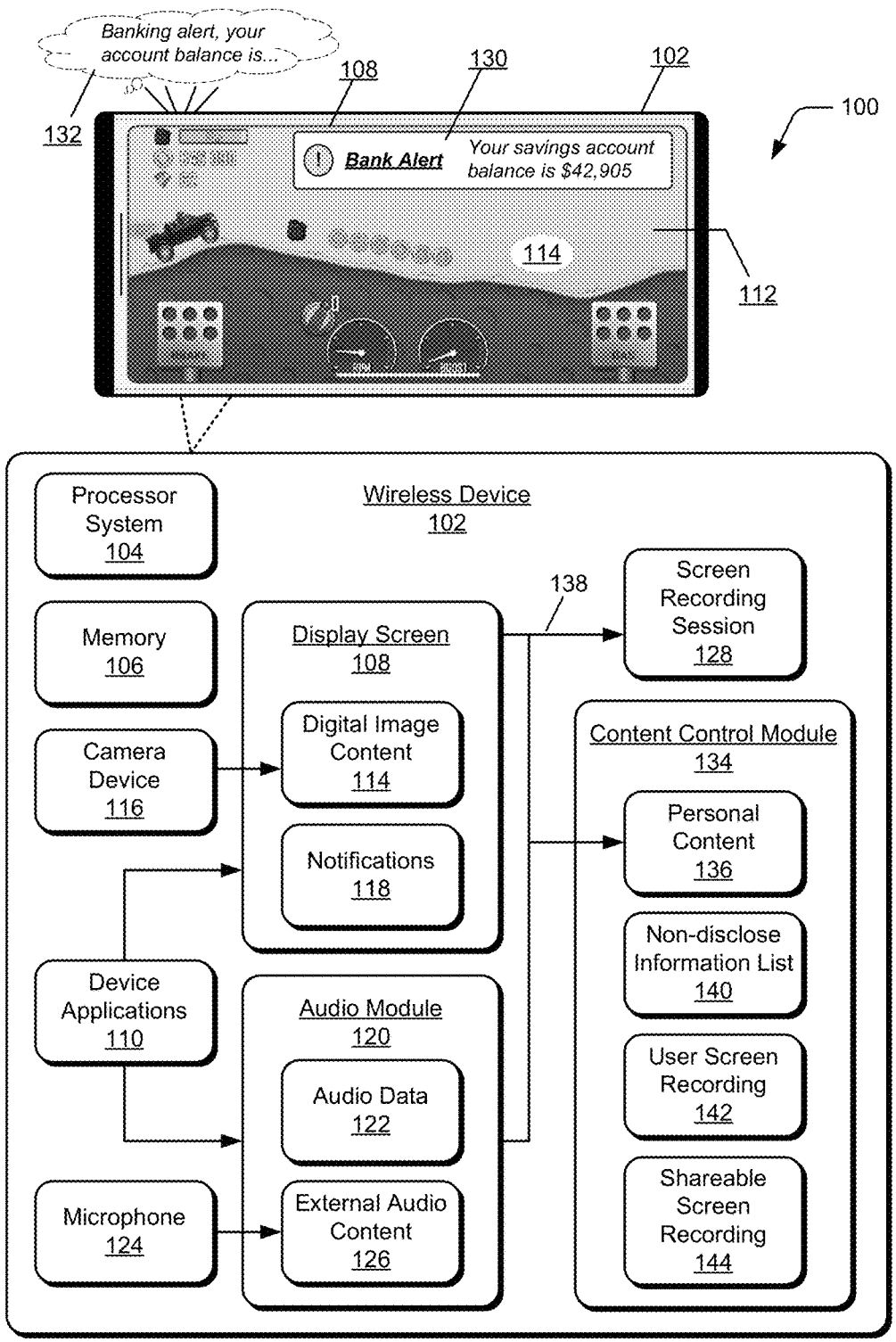
FIG. 1 illustrates an example of techniques for personal content managed during device screen recording using a wireless device in accordance with one or more implementations as described herein.

Implementations of personal content managed during screen recording are described, and provide techniques that can be implemented by any type of computing devices, such as smart devices, mobile devices (e.g., cellular phones, tablet devices, smartphones), consumer electronics, and the like. Generally, a screen recording feature may be included as a device function in a wireless device, and can be initiated by a user who is operating the device to capture a sequence of device inputs and operations, application features, and resulting displayed outputs. A user may initiate a screen recording session on the wireless device, thus capturing an instruction tutorial with audio and/or video, which can then be shared on any number of social media platforms for access by others. For example, a user who is proficient with particular device operations or software application features will perform the device operations, or run through the application features, while screen recording their own device. The screen recording feature provides for convenient content generation and sharing from the single device itself.

However, given the nature and general purpose of a wireless device (e.g., a smartphone for communication), it is quite likely that a user will receive some type of a notification that displays on the display screen of the device during a screen recording session, such as a pop-up notification that indicates an alarm, having received a text message or a new email message, a notification of an incoming video call or phone call, or any other type of a banner notice of a received communication. The notification that displays automatically on the display screen of the device will then be recorded as part of the screen recording session, and will be shared publicly when the recording is posted to any number of the social media platforms. Unfortunately, this can lead to personal content, or PII (personally identifiable information) of the user being publicly disclosed in the form of audio and/or video content, such as user contact details, photos, login credentials, financial transaction details, biometric information, etc. that is private and sensitive data of the user. Generally, any type of information which is personal in nature to the user of a device may be inadvertently disclosed during a screen recording session that captures digital image content and/or audio content on the device.

In aspects of personal content managed during device screen recording, a wireless device has a display screen to display digital image content, and includes an audio module to process audio data. A screen recording session can be initiated to capture the digital image content and the audio data. The wireless device implements a content control module that determines the screen recording session captures personal content associated with a user of the wireless device. The personal content may be captured as part of the digital image content or as part of the audio data. In implementations, the content control module can identify the personal content as a type of personally identifiable information from a non-disclosable information list.

The content control module can generate a user screen recording having a user authorization access level. The user screen recording includes the digital image content and/or the audio data, as well as the personal content unaltered for user review of the user screen recording. Notably, the user of the wireless device who has initiated the screen recording session has full authorization to playback the recording and fully review the personal content unobscured and unfiltered as it was captured. The content control module can also generate a shareable screen recording having a share authorization access level. The shareable screen recording includes the digital image content and/or the audio data, but with the personal content obfuscated. Notably, the shareable screen recording can be shared with others, such as when the recording is posted to any number of the social media platforms, yet viewers of the recording will not be able to see the personal content that may have been captured as part of the digital image content, or hear the personal content that may have been captured as part of the audio data. The content control module can obscure the personal content captured as part of the digital image content to prevent a visual display of the personal content during playback of the shareable screen recording. Similarly, the content control module can generate the shareable screen recording so as to mute an audio output of the audio data during playback of the shareable screen recording to prevent revealing the personal content captured as part of the audio data The wireless device may be implemented with a microphone to detect external audio content that is processed by the audio module of the wireless device as the audio data. The content control module can determine that the personal content associated with the user of the device is captured as the external audio content during the screen recording session. The content control module can then generate the shareable screen recording to mute an audio output of the audio data during playback of the shareable screen recording to prevent revealing the personal content.

The wireless device may also be implemented with a camera device to capture the digital image content that is displayed on the display screen of the wireless device. The content control module can determine that the personal content associated with the user of the device is captured as part of the digital image content during the screen recording session. The content control module can then obscure the personal content captured as part of the digital image content to prevent a visual display of the personal content during playback of the shareable screen recording.

In aspects of personal content managed during extended display screen recording, a screen recording system includes an extended display device to display digital image content received for display from a wireless device. The system also includes the wireless device that provides the digital image content for display on the extended display device. The wireless device may also have a screen recording session initiated to capture the digital image content, as well as audio data. The wireless device implements a content control module that determines the screen recording session would capture personal content associated with a user of the wireless device. The personal content may be captured as part of the digital image content or as part of the audio data. In implementations, the content control module can identify the personal content as a type of personally identifiable information from a non-disclosable information list.

The content control module can initiate a private screen review mode in which the personal content is displayable on a display screen of the wireless device, and is prevented from visual display on the extended display device. The content control module can filter the digital image content and the audio data to exclude the personally identifiable information associated with the user of the wireless device. The content control module can also generate a private screen recording that includes the digital image content and/or the audio data, as well as the personal content unaltered for user review of the private screen recording. The content control module can also generate a shareable screen recording that includes the audio data and the digital image content displayed on the extended display device, without including the personal content. The shareable screen recording is generated for uninterrupted playback without the personal content, and the shareable screen recording can be shared with others, such as when the recording is posted to any number of the social media platforms.

The wireless device can include a microphone to detect external audio content that is processed as the audio data by the audio module of the wireless device. The content control module can determine that the personal content associated with the user of the device is captured as the external audio content during the screen recording session, and then filter the audio data to exclude the external audio content from the shareable screen recording to prevent revealing the personal content. The wireless device can also include a camera device to capture the digital image content that is displayed on the extended display device. The content control module can determine that the personal content associated with the user of the device is captured as part of the digital image content during the screen recording session, and then filter the digital image content to exclude the personal content from the shareable screen recording to prevent a visual display of the personal content.

While features and concepts of personal content managed during screen recording can be implemented in any number of different devices, systems, environments, and/or configurations, implementations of personal content managed during screen recording are described in the context of the following example devices, systems, and methods.

FIG. 1 illustrates an example 100 of techniques for personal content managed during device screen recording, such as implemented with a wireless device 102. In this example 100, the wireless device 102 may be any type of a mobile phone, flip phone, computing device, tablet device, and/or any other type of device. Generally, the wireless device 102 may be any type of an electronic, computing, and/or communication device implemented with various components, such as a processor system 104 and memory 106, as well as any number and combination of different components as further described with reference to the example device shown in FIG. 13. For example, the wireless device 102 can include a power source to power the device, such as a rechargeable battery and/or any other type of active or passive power source that may be implemented in an electronic, computing, and/or communication device.

The wireless device 102 includes a display screen 108, which may be a flat display screen or a curved display that wraps around, or partially wraps, the vertical sides of the wireless device. The wireless device 102 also includes device applications 110, such as a text application, email application, video service application, cellular communication application, music application, gaming application, and/or any other of the many possible types of device applications. Many device applications 110 have an associated user interface that is generated and displayed for user interaction and viewing, such as the user interface 112 of a gaming application shown on the display screen 108 of the wireless device in this example. The display screen 108 of the wireless device 102 can display a user interface that is associated with any of the device applications 110. Generally, a user interface, or any other type of video, image, graphics, and the like is digital image content 114 that is displayable on the display screen 108 of the wireless device.

In this example 100, the wireless device 102 includes a camera device 116, such as a front-facing camera, a rear-facing camera, or multiple camera devices. The camera device 116 can be utilized to capture still images and/or video, which is also displayable on the display screen 108 of the wireless device as the digital image content 114. The many different types of device applications 110 can also generate and display notifications 118 as a type of the digital image content 114 that is displayable on the display screen 108 of the wireless device. For example, the notifications 118 that may be generated by the device applications 110 can be displayed as pop-up notifications, such as to inform the user of the device that a new text or email message has been received, to indicate an upcoming meeting or event, as an indication of an incoming phone call, as a calendar or alarm reminder, as a credit card or banking alert, or as any other type of the many possible pop-up and banner notifications a user may receive on his or her device.

In this example 100, the wireless device 102 also includes an audio module 120, which processes the audio data 122 on the wireless device, such as the audio data generated by the device applications 110 in conjunction with the associated digital image content 114. For example, the gaming application that generates the user interface 112 shown on the display screen 108 of the wireless device also generates the audio data 122 that is associated with the display of the gaming user interface. Generally, the gaming user interface 112 and the corresponding audio data 122 of the gaming application are rendered together by an audio and/or video processing system of the wireless device, such as described with reference to the example device shown in FIG. 13.

The wireless device 102 also includes a microphone 124 that can be utilized to detect external audio content 126, which is captured and processed as part of the audio data 122 by the audio module 120 of the wireless device. For example, a speaker system of the wireless device may emit audio, such as music, a speaker's voice, or other audio generated by a device application 110, and the microphone can pick-up the audio emitted from the speaker system of the device. Similarly, the microphone may detect and pick-up other sounds and voices in the environment in which the wireless device is being used, and the external audio content 126 from the environment may be processed as the audio data 122 by the audio module 120.

In implementations, a screen recording session 128 may be initiated on the wireless device 102 with a media content recording system to capture a recording of the digital image content 114 (to include the notifications 118) and the audio data 122 (to include the external audio content 126). Generally, the wireless device includes a screen recording feature, which can be initiated as the screen recording session 128 by a user who is operating the device to capture a sequence of device inputs and operations, application features, and resulting displayed outputs. A user may initiate the screen recording session 128 on the device in any number of various scenarios, such as to create an instruction tutorial for others. Notably, the screen recording session 128 can capture any one or more of the digital image content 114, the notifications 118, the audio data 122, and/or the external audio content 126 in a recording.

However, a notification 118 may display on the display screen 108 of the wireless device 102 during the screen recording session 128, such as the "bank alert" notification 130 shown as a received banner notification in this example 100. Alternatively or in addition, the microphone 124 may pick-up the external audio content 126 during the screen recording session 128, or other unintended audio data 122, which is processed by the audio module 120 in the device during the screen recording session. For example, the user may have the wireless device 102 set to audibly read out notifications that are received by the device, such as the audible announcement 132 of the "bank alert" notification, which is read out and picked-up as external audio content 126 by the microphone 124 of the device. These notifications 118 and the audio data 122 may contain personal content of the user, which is captured in the recording during the screen recording session 128.

In this example, the notification 130 that displays automatically on the display screen 108 of the device, as well as the audible announcement 132 of the notification, will then be recorded as part of the screen recording session 128 and will be shared publicly when the recording is posted to any number of the social media platforms chosen by the user of the device. Unfortunately, this can lead to personal content (also referred to as "personally identifiable information") of the user being publicly disclosed in the form of audio and/or video content. Notably, a user likely does not want to share this type of personal information, such as user contact details, photos, login credentials, financial transaction details, biometric information, medical information, employment information, etc. that is private and sensitive data of the user.

In this example 100, the wireless device 102 implements a content control module 134, which may include independent processing, memory, and/or logic components functioning as a computing and/or electronic device integrated with the wireless device 102. Alternatively or in addition, the content control module 134 can be implemented in software, in hardware, or as a combination of software and hardware components. In this example, the content control module 134 is implemented as a software application or module, such as executable software instructions (e.g., computer-executable instructions) that are executable with a processor (e.g., with the processor system 104) of the wireless device 102 to implement the techniques and features of personal content managed during screen recording, as described herein.

As a software application or module, the content control module 134 can be stored on computer-readable storage memory (e.g., the memory 106 of the device), or in any other suitable memory device or electronic data storage implemented with the module. Alternatively or in addition, the content control module 134 may be implemented in firmware and/or at least partially in computer hardware. For example, at least part of the modules may be executable by a computer processor, and/or at least part of the modules may be implemented in logic circuitry.

In implementations, the content control module 134 is implemented by the wireless device 102 to determine that the screen recording session 128 captures personal content 136 associated with the user of the device, where the personal content 136 is captured as part of the digital image content 114 or as part of the audio data 122, to include the notifications 118 and the external audio content 126. As illustrated in this example 100, media content streams 138 of the various media and data streams in the device are captured as part of the screen recording session 128, namely the digital image content 114, the notifications 118, the audio data 122, and/or the external audio content 126.

The content control module 134 can be implemented with any of a variety of public or proprietary algorithms or other logic to identify the personal content 136 that is associated with the user as any type of personally identifiable information (PII) from a non-disclose information list 140. The content control module 134 can differentiate personal content from non-personal content, and identify the device applications 110 that likely include PII data, such as including or related to email, calendar, contacts, reminders, memory aids, shopping lists, and generally any type of information which is personal in nature to the user of a device. Non-personal content may include weather, news, time, and sports updates, as well as any other type of readily available public information.

In implementations, the content control module 134 can determine that personal content 136 associated with the user of the wireless device 102 is captured as any one or more of the digital image content 114, the notifications 118, the audio data 122, and the external audio content 126 during the screen recording session 128. The content control module 134 can then generate a user screen recording 142 having a first authorization access level for the user of the device, and also generate a shareable screen recording 144 having a second authorization access level to prevent revealing the personal content 136 that has been captured during the screen recording session 128. The content control module 134 generates each of the user screen recording 142 and the shareable screen recording 144 as an aggregation of the media content from the various input streams of digital image content and audio data, and at the different authorization access levels.

The user screen recording 142 is generated without filtering the personal content 136 and has a user authorization access level (e.g., the first or higher of the authorization access levels). The user screen recording 142 includes one or more of the digital image content 114, the notifications 118, the audio data 122, and the external audio content 126, as well as the personal content 136 unaltered or unfiltered for user review of the user screen recording. The content control module 134 can also be implemented to provide the user with an option to create a password for the user authorization access level, and protect the user screen recording 142 with the password which is known to user of the device who initiated the screen recording session 128.

Additionally, the shareable screen recording 144 is generated with the personal content 136 filtered and has a share authorization access level (e.g., the second or lower of the authorization access levels). The shareable screen recording 144 includes one or more of the digital image content 114, the notifications 118, the audio data 122, and the external audio content 126, as well as the personal content 136 obfuscated so as not to reveal the personal content that is associated with the user of the device. The user may also be provided with an option to create a password for the share authorization access level. Additionally, the user of the wireless device 102 can be provided filtering options, such as to filter the digital image content 114 that contains the personal content 136, filter the audio data 122 that contains the personal content, or both. The user can filter the shareable screen recording 144 by selectively muting a portion of the audio output of the recording and/or blurring or otherwise obscuring a portion of the visual content of the recording.

For example, the content control module 134 can generate the shareable screen recording 144 to mute an audio output for the audio portions of the audio data 122 that contain the personal content 136 during playback of the shareable screen recording to prevent revealing the personal content captured as part of the audio data. Additionally, the content control module 134 can obscure the visual portion of the digital image content 114 that contains the personal content 136 captured as part of the screen recording session 128 to prevent a visual display of the personal content during playback of the shareable screen recording. For example, the visual portion of the digital image content 114 that contains the personal content 136 can be blurred or otherwise altered, such as with an overlay to prevent display of the personal content. Alternatively, portions or sections of previous and/or subsequent digital frames of the digital image content can be utilized to mask over the personal content 136, giving the visual appearance of no interruption to the screen recording session 128 from which the shareable screen recording 144 is generated.

In implementations, the content control module 134 can generate the user screen recording 142 and the shareable screen recording 144 as the screen recording session 128 is in progress, during post-processing after the recordings are generated, or some combination thereof. Notably, when the shareable screen recording is shared, such as via any number of the available social media platforms, viewers of the recording will not have authorization to view the personal content 136 that has been obfuscated, such as the muted audio that contains the personal content and/or the obscured portions of the digital image content that contains the personal content.

Figure 2:
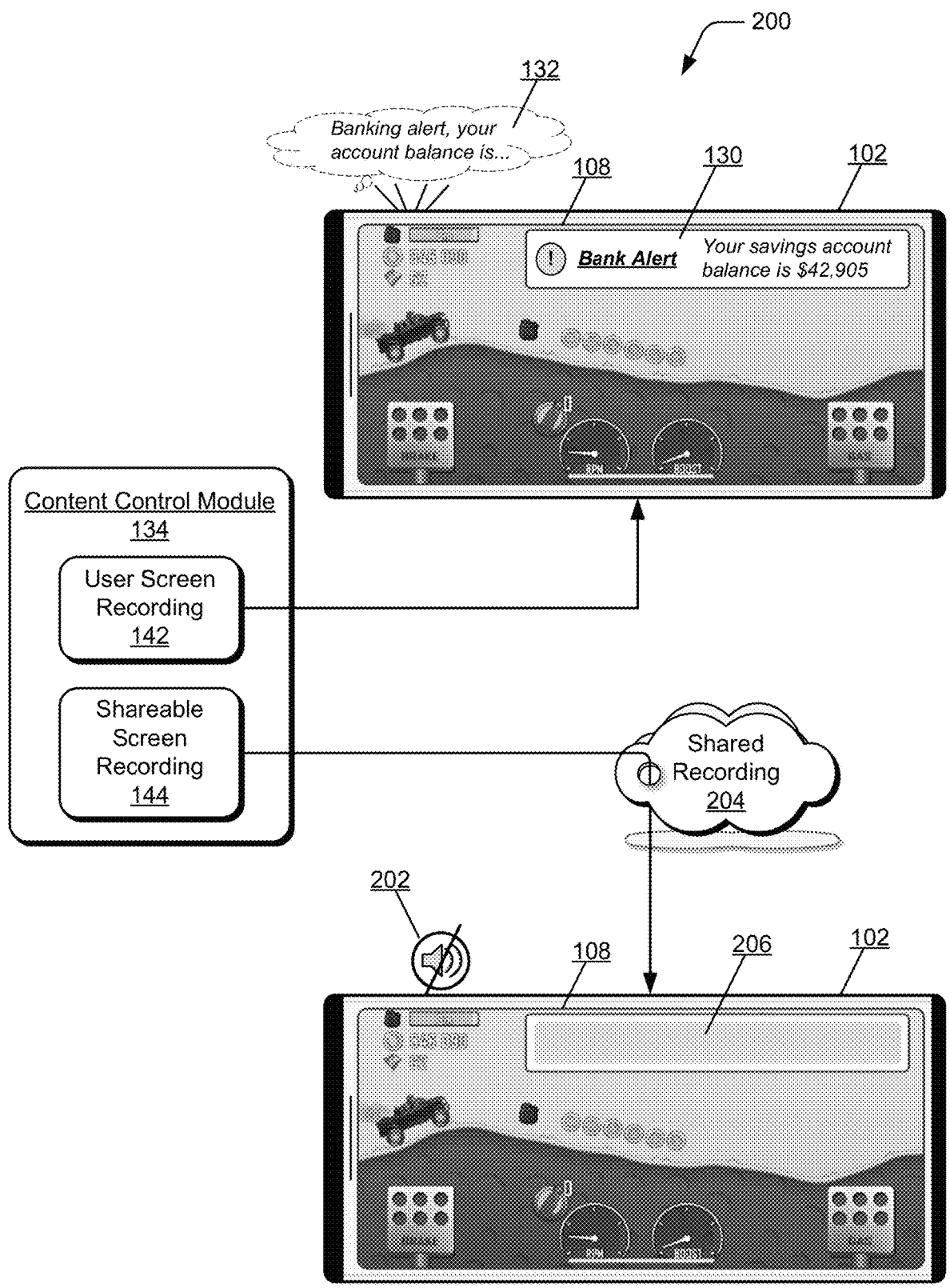
FIG. 2 illustrates examples of features for personal content managed during device screen recording using a wireless device in accordance with one or more implementations as described herein.

FIG. 2 further illustrates examples 200 of aspects and features for personal content managed during device screen recording, as described herein, such as using the wireless device 102 as shown and described with reference to FIG. 1. As shown in this example, the content control module 134 implemented by the wireless device 102 generates the user screen recording 142 and the shareable screen recording 144. As noted above, the user screen recording 142 is generated without filtering the personal content 136 and the user of the wireless device can review the user screen recording 142 on his or her device, including the personal content 136, such as the notification 130 that displays on the display screen 108 of the device and the audible announcement 132.

Further, the shareable screen recording 144 is generated with the personal content 136 filtered so as not to reveal the personal content that is associated with the user of the device after the recording is uploaded (e.g., to the "cloud") and shared on social media as a shared recording 204 for others to view. For example, the content control module 134 can generate the shareable screen recording 144 to mute the audio output 202 for the audio portions of the audio data 122 that contain the personal content 136 during playback of the shareable screen recording to prevent revealing the personal content captured as part of the audio data.

Additionally, the content control module 134 can obscure the visual portion of the digital image content 114 that contains the personal content 136 captured as part of the screen recording session 128 to prevent a visual display of the personal content during playback of the shareable screen recording. As shown in this example, the notification 130 that was captured with the screen recording session 128 and generated as part of the shareable screen recording 144 is obscured with an overlay 206. Any other technique may be implemented, such as blurring, editing, removing, and the like so as not to reveal the personal content during playback of the shareable screen recording 144 when viewed by others.

Example methods 300, 400, 500, and 600, as well as example methods 900, 1000, 1100, and 1200, are described with reference to respective FIGS. 3-6 and 9-12 in accordance with implementations of personal content managed during screen recording, such as during device screen recording or during extended display screen recording. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
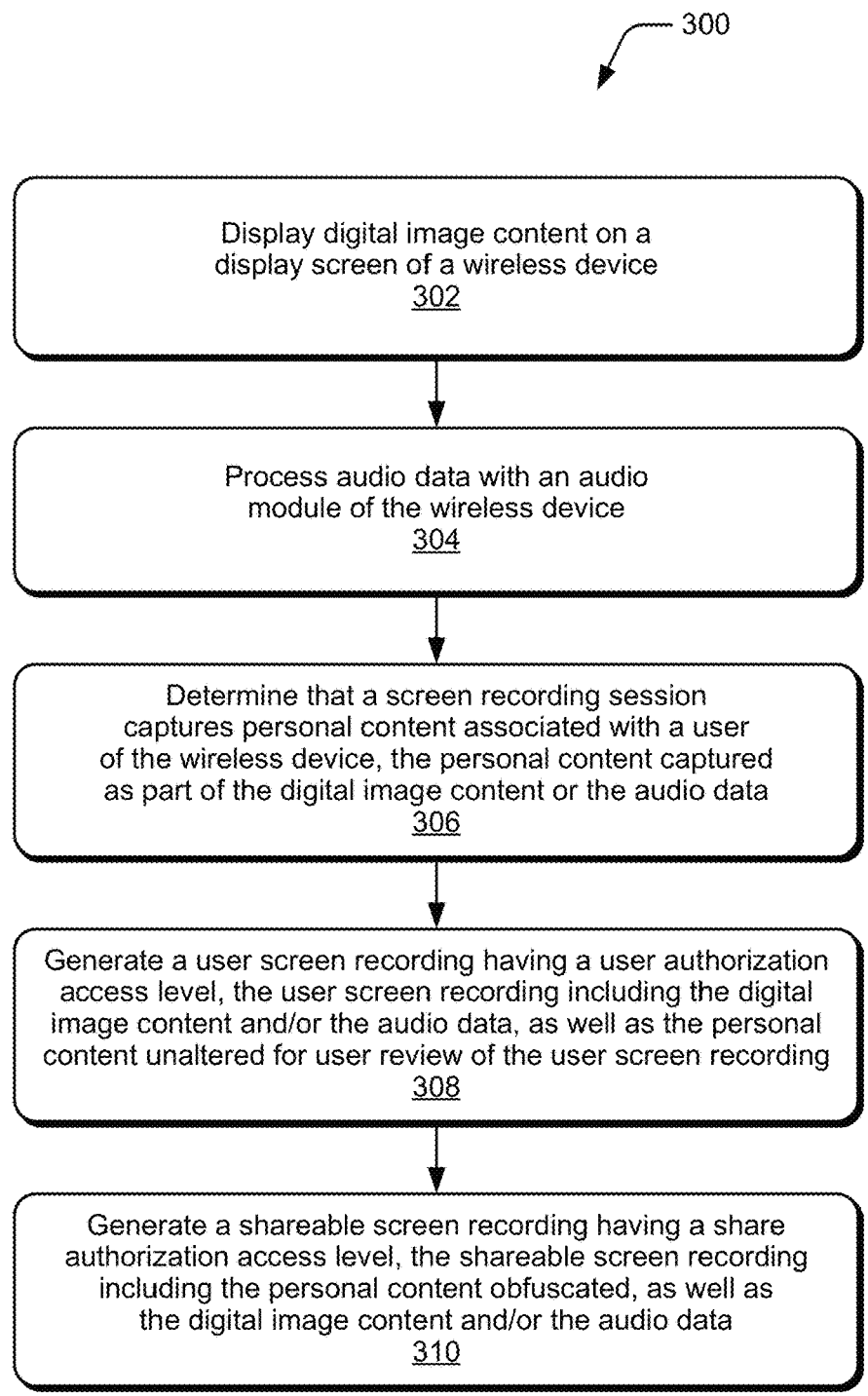
FIGS. 3-6 illustrate example methods of personal content managed during device screen recording in accordance with one or more implementations of the techniques described herein.

FIG. 3 illustrates example method(s) 300 of personal content managed during device screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 302, digital image content is displayed on a display screen of a wireless device. For example, the wireless device 102 includes any number of device applications 110 that generate digital image content 114, which is displayed for user interaction and viewing on the display screen 108 of the device, such as the user interface 112 of a gaming application displayed on the display screen 108 of the wireless device. The display screen 108 of the wireless device 102 can display an application user interface, or any other type of digital image content 114, associated with any of the device applications 110. Generally, an application user interface, or any other type of video, image, graphics, and the like is digital image content 114 that is displayable on the display screen 108 of the wireless device.

At 304, audio data is processed with an audio module of the wireless device. For example, the audio module 120 of the wireless device 102 processes the audio data 122 on the wireless device, such as the audio data generated by the device applications 110 in conjunction with the associated digital image content 114. For example, the gaming application that generates the user interface 112 displayed on the display screen 108 of the wireless device also generates the audio data 122 that is associated with the display of the gaming user interface. Generally, the gaming user interface 112 and the corresponding audio data 122 of the gaming application are rendered together by an audio and/or video processing system of the wireless device, such as described with reference to the example device shown in FIG. 13.

At 306, a determination is made that a screen recording session captures personal content associated with a user of the wireless device, the personal content captured as part of the digital image content or the audio data. For example, the content control module 134 implemented by the wireless device 102 determines that the screen recording session 128 captures personal content 136 associated with the user of the device, where the personal content 136 is captured as part of the media content streams 138 of the various media and data streams in the device, such as the digital image content 114, the notifications 118, the audio data 122, and/or the external audio content 126. The content control module 134 can differentiate personal content from non-personal content, and identify the personal content 136 that is associated with the user as any type of personally identifiable information (PII) from the non-disclose information list 140.

At 308, a user screen recording is generated and has a user authorization access level, the user screen recording including the digital image content and/or the audio data, as well as the personal content unaltered for user review of the user screen recording. For example, the content control module 134 implemented by the wireless device 102 generates the user screen recording 142 without filtering the personal content 136 and has a user authorization access level (e.g., the first or higher of the authorization access levels). The user screen recording 142 includes one or more of the digital image content 114, the notifications 118, the audio data 122, and the external audio content 126, as well as the personal content 136 unaltered or unfiltered for user review of the user screen recording.

At 310, a shareable screen recording is generated and has a share authorization access level, the shareable screen recording including the personal content obfuscated, as well as the digital image content and/or the audio data. For example, the content control module 134 implemented by the wireless device 102 generates the shareable screen recording 144 with the personal content 136 filtered and has a share authorization access level (e.g., the second or lower of the authorization access levels). The shareable screen recording 144 includes one or more of the digital image content 114, the notifications 118, the audio data 122, and the external audio content 126, as well as the personal content 136 obfuscated so as not to reveal the personal content that is associated with the user of the device.

In implementations, the content control module 134 generates the shareable screen recording 144 to mute the audio output 202 for the audio portions of the audio data 122 that contain the personal content 136 during playback of the shareable screen recording to prevent revealing the personal content captured as part of the audio data. Additionally, the content control module 134 can obscure the visual portion of the digital image content 114 that contains the personal content 136 to prevent a visual display of the personal content during playback of the shareable screen recording. For example, the visual portion of the digital image content 114 that contains the personal content 136 can be blurred or otherwise altered, such as with an overlay 206 to prevent display of the personal content.

Figure 4:
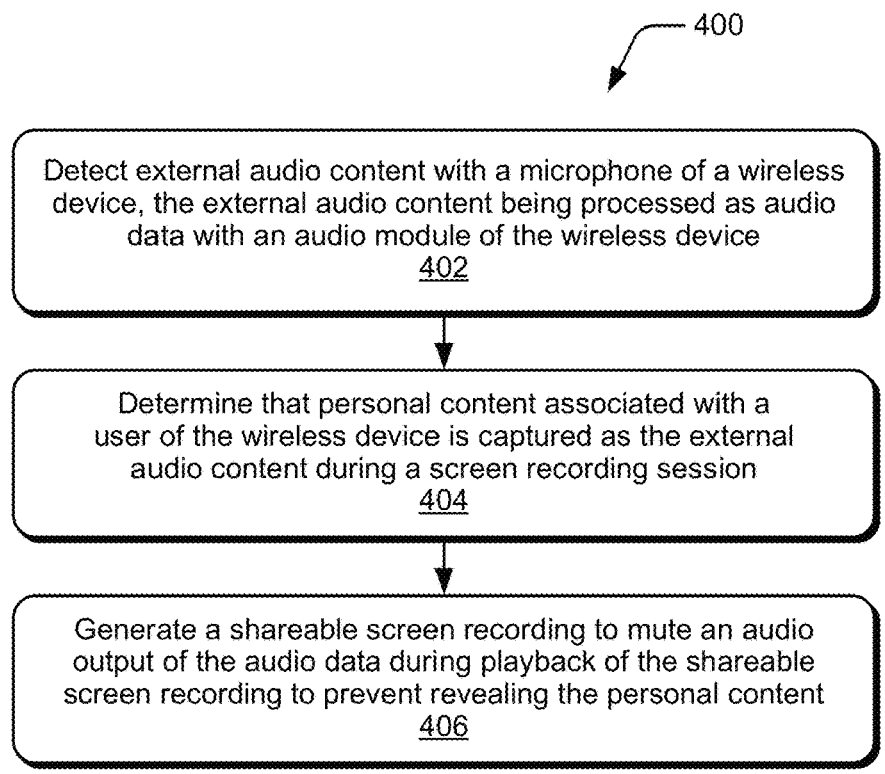

FIG. 4 illustrates example method(s) 400 of personal content managed during device screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 402, external audio content is detected with a microphone of a wireless device, the external audio content being processed as audio data with an audio module of the wireless device. For example, the microphone 124 of the wireless device 102 detects the external audio content 126, which is captured and processed as part of the audio data 122 by the audio module 120 of the device. For example, a speaker system of the wireless device may emit audio, such as music, a speaker's voice, or other types of audio, and the microphone can pick-up the audio emitted from the speaker system of the device. Similarly, the microphone may detect and pick-up other sounds and voices in the environment in which the wireless device is being used, and the external audio content 126 from the environment is processed as part of the audio data 122 by the audio module 120.

At 404, a determination is made that personal content associated with a user of the wireless device is captured as the external audio content during a screen recording session. For example, the content control module 134 implemented by the wireless device 102 determines that personal content 136 associated with the user of the wireless device 102 is captured as the external audio content 126 during the screen recording session 128. The microphone 124 can pick-up the external audio content 126, which is processed by the audio module 120 in the device during the screen recording session. For example, the user may have the wireless device 102 set to audibly read out notifications that are received by the device, which are then picked-up as external audio content 126 by the microphone 124 of the device, and may contain personal content of the user captured in the recording during the screen recording session 128.

At 406, a shareable screen recording is generated so as to mute an audio output of the audio data during playback of the shareable screen recording to prevent revealing the personal content. For example, the content control module 134 implemented by the wireless device 102 generates the shareable screen recording 144 to mute the audio output 202 for the audio portions of the audio data 122 that contain the personal content 136 during playback of the shareable screen recording to prevent revealing the personal content captured as part of the audio data.

Figure 5:
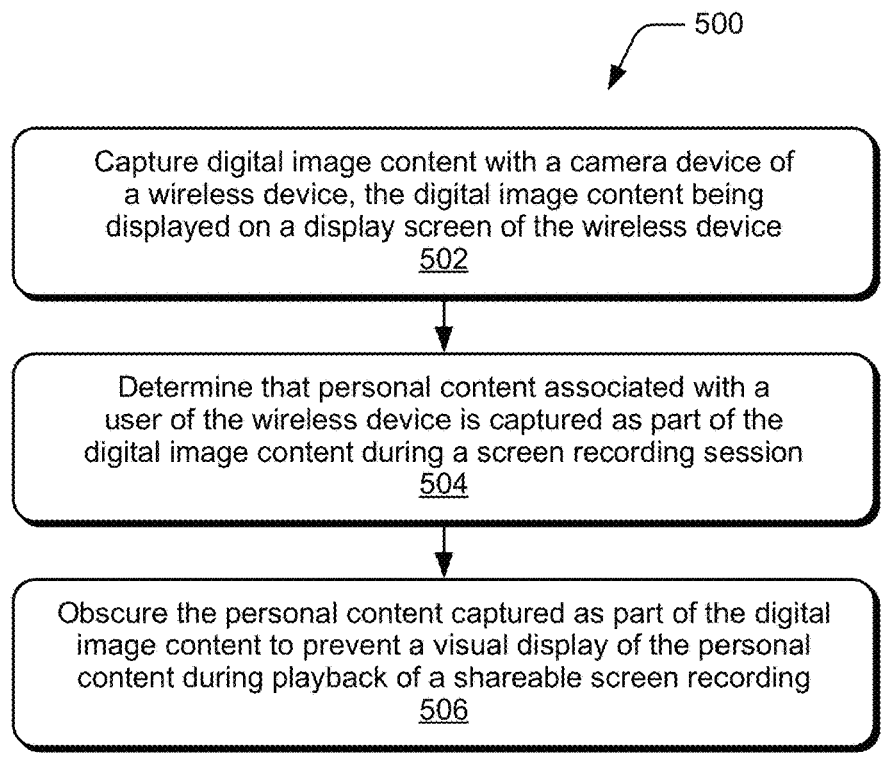

FIG. 5 illustrates example method(s) 500 of personal content managed during device screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 502, digital image content is captured with a camera device of a wireless device, the digital image content being displayed on a display screen of the wireless device. For example, the camera device 116 of the wireless device 102 captures the digital image content 114 that is displayed on the display screen 108 of the wireless device. The camera device 116 may be a front-facing camera, a rear-facing camera, or multiple camera devices, and can be utilized to capture still images and/or video, which is displayable on the display screen 108 of the wireless device as the digital image content 114.

At 504, a determination is made that personal content associated with a user of the wireless device is captured as part of the digital image content during a screen recording session. For example, the content control module 134 implemented by the wireless device 102 determines that personal content 136 associated with the user of the wireless device 102 is captured as part of the digital image content 114 during the screen recording session 128. When activated, the camera device 116 may capture personal content 136 associated with the user of the wireless device as part of the digital image content 114 that is displayed on the display screen 108 of the wireless device, and subsequently captured as part of the screen recording session 128.

At 506, the personal content captured as part of the digital image content is obscured to prevent a visual display of the personal content during playback of a shareable screen recording. For example, the content control module 134 implemented by the wireless device 102 generates the shareable screen recording 144 and obscures the visual portion of the digital image content 114 that contains the personal content 136 to prevent a visual display of the personal content during playback of the shareable screen recording. For example, the visual portion of the digital image content 114 that contains the personal content 136 can be blurred or otherwise altered, such as with an overlay 206 to prevent display of the personal content.

Figure 6:
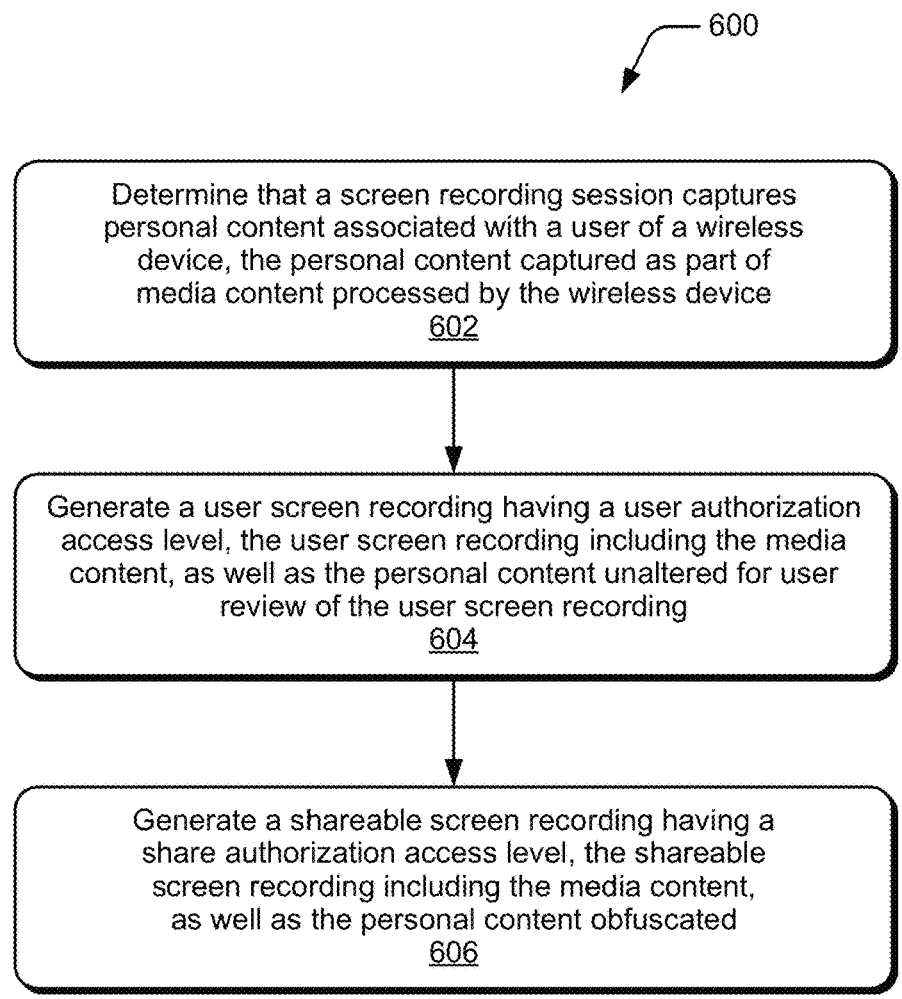

FIG. 6 illustrates example method(s) 600 of personal content managed during device screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 602, a determination is made that a screen recording session captures personal content associated with a user of a wireless device, the personal content captured as part of media content processed by the wireless device. For example, the content control module 134 implemented by the wireless device 102 determines that the screen recording session 128 captures personal content 136 associated with the user of the device, where the personal content 136 is captured as part of the media content streams 138 of the various media and data streams in the device, such as the digital image content 114, the notifications 118, the audio data 122, and/or the external audio content 126. The content control module 134 can differentiate personal content from non-personal content, and identify the personal content 136 that is associated with the user as any type of personally identifiable information (PII) from the non-disclose information list 140.

At 604, a user screen recording is generated and has a user authorization access level, the user screen recording including the media content, as well as the personal content unaltered for user review of the user screen recording. For example, the content control module 134 implemented by the wireless device 102 generates the user screen recording 142 without filtering the personal content 136 and has a user authorization access level (e.g., the first or higher of the authorization access levels). The user screen recording 142 includes the media content as one or more of the digital image content 114, the notifications 118, the audio data 122, and the external audio content 126, as well as the personal content 136 unaltered or unfiltered for user review of the user screen recording.

At 606, a shareable screen recording is generated and has a share authorization access level, the shareable screen recording including the media content, as well as the personal content obfuscated. For example, the content control module 134 implemented by the wireless device 102 generates the shareable screen recording 144 with the personal content 136 filtered and has a share authorization access level (e.g., the second or lower of the authorization access levels). The shareable screen recording 144 includes the media content as one or more of the digital image content 114, the notifications 118, the audio data 122, and the external audio content 126, as well as the personal content 136 obfuscated so as not to reveal the personal content that is associated with the user of the device.

In implementations, the content control module 134 generates the shareable screen recording 144 to mute the audio output 202 for the audio portions of the media content (e.g., the audio data 122) that contain the personal content 136 during playback of the shareable screen recording to prevent revealing the personal content captured as part of the media content. Additionally, the content control module 134 can obscure the visual portion of the media content (e.g., the digital image content 114) that contains the personal content 136 to prevent a visual display of the personal content during playback of the shareable screen recording. For example, the visual portion of the media content that contains the personal content 136 can be blurred or otherwise altered, such as with an overlay 206 to prevent display of the personal content.

Figure 7:
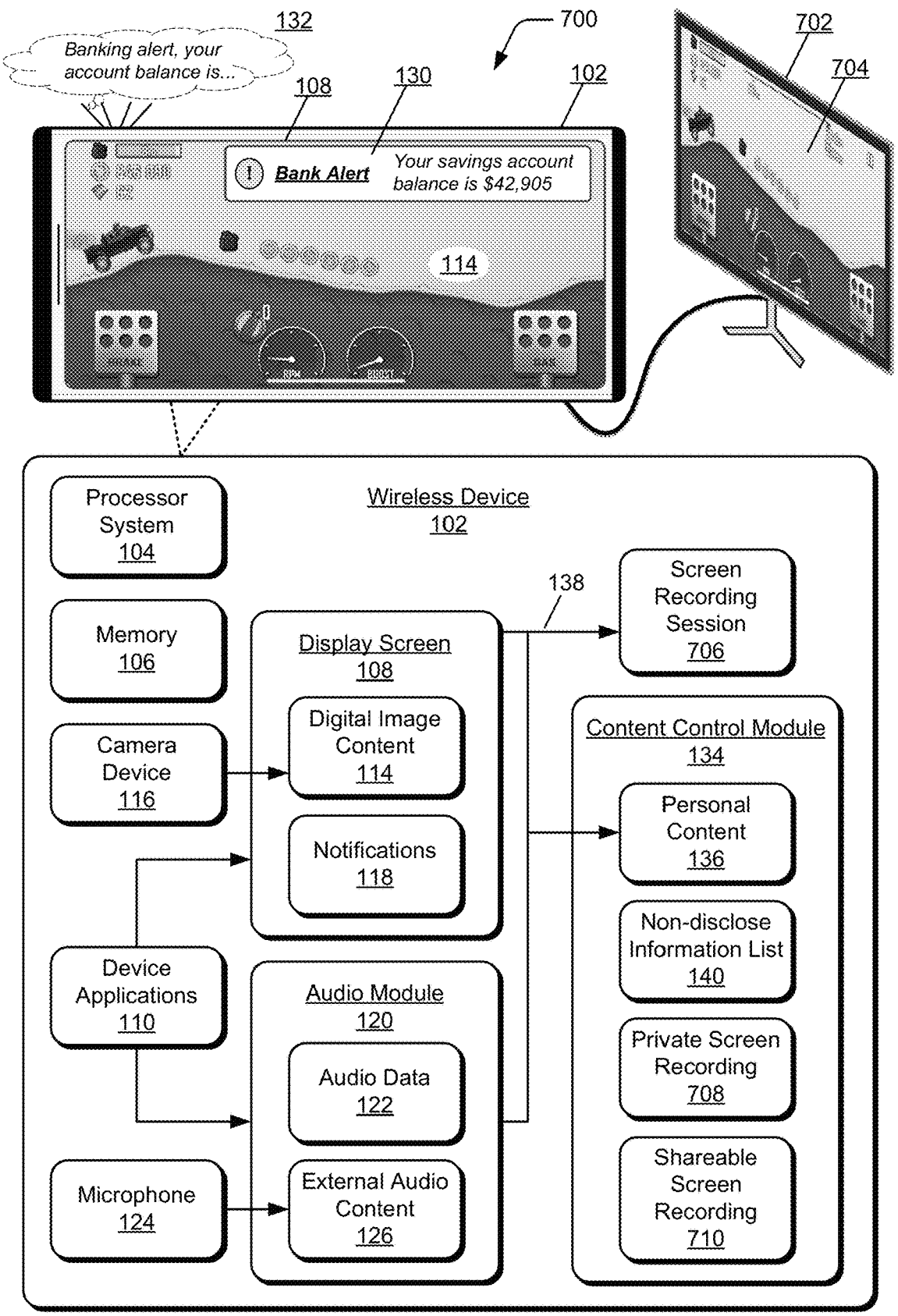
FIG. 7 illustrates an example of techniques for personal content managed during extended display screen recording using a wireless device in accordance with one or more implementations as described herein.

FIG. 7 illustrates an example 700 of techniques for personal content managed during extended display screen recording, such as implemented with the wireless device 102 shown and described with reference to FIG. 1. In this example 700, a screen recording system includes an extended display device 702 to display digital image content 704 received for display. The screen recording system also includes the wireless device 102 that provides the digital image content for display on the extended display device 702, either by a wired or wireless connection to the extended display device. As shown in this example, the digital image content 114 of the gaming application user interface, which is displayed on the display screen 108 of the wireless device, is also provided for display as the digital image content 704 displayed on the extended display device 702.

In implementations, a screen recording session 706 may be initiated on the wireless device 102 with a media content recording system to capture a recording of the digital image content 114 (to include the notifications 118) and the audio data 122 (to include the external audio content 126). Generally, the wireless device includes the screen recording feature, which can be initiated as the screen recording session 706 by a user who is operating the device to capture a sequence of device inputs and operations, application features, and resulting displayed outputs. Notably, the screen recording session 706 can capture any one or more of the digital image content 114, the notifications 118, the audio data 122, and/or the external audio content 126 in a recording.

With a conventional screen recording feature, a notification 118 that displays on the display screen 108 of the wireless device 102 during the screen recording session 706 would also be displayed as part of the digital image content 704 displayed on the extended display device 702 in this example 700 of a screen recording system. Additionally, the microphone 124 may pick-up the external audio content 126 during the screen recording session 706, or other unintended audio data 122, which is processed by the audio module 120 in the device during the screen recording session. These notifications 118 and the audio data 122 may contain personal content of the user, which is captured in the recording during the screen recording session 706.

In this example 700, the wireless device 102 implements the content control module 134, which is implemented to monitor for, identify, and determine that personal content 136 associated with the user of the wireless device 102 would be captured during the screen recording session 706 as part of the digital image content 114 or as part of the audio data 122, to include the notifications 118 and the external audio content 126. The content control module 134 can monitor for the personal content 136 at an operating system level, application layer, and/or data layer of the device. As illustrated in this example 700, the media content streams 138 of the various media and data streams in the device are captured as part of the screen recording session 706, namely the digital image content 114, the notifications 118, the audio data 122, and/or the external audio content 126.

In implementations, the content control module 134 can initiate a private screen review mode to generate a private screen recording 708 and filter the digital image content 114 and the audio data 122 to exclude the personal content 136 (e.g., personally identifiable information) associated with the user of the wireless device. In the private screen review mode, the personal content 136 is displayable on the display screen 108 of the wireless device 102, but is prevented from visual display on the extended display device 702. For example, the "bank alert" notification 130 shown as the received banner notification that displays on the display screen 108 of the wireless device 102 is not communicated or provided as part of the digital image content 114 for display on the extended display device 702 as part of the displayed digital image content 704. Additionally, the audible announcement 132 of the "bank alert" notification is not extended for playback by a speaker system of the extended display device 702 (or to any other external speaker system). Only the wireless device 102 displays an incoming notification 118 and/or emits an audio output from the audio data 122 that may contain personal content 136 of the user of the device.

The content control module 134 can generate a private screen recording 708 that includes media content output at the wireless device 102, and can also generate a shareable screen recording 710 that includes media content output at the extended display device 702, which has been captured during the screen recording session 706. The content control module 134 generates each of the private screen recording 708 and the shareable screen recording 710 as an aggregation of the media content from the various input streams of digital image content and audio data. Additionally, each of the private screen recording 708 and the shareable screen recording 710 may be generated with different authorization access levels.

The content control module 134 generates the private screen recording 708 to include one or more of the digital image content 114, the notifications 118, the audio data 122, and the external audio content 126, as well as the personal content 136 unaltered or unfiltered for user review of the private screen recording. The content control module 134 can also be implemented to provide the user with an option to create a password and protect the private screen recording 708 with the password which is known to user of the device who initiated the screen recording session 706.

The content control module 134 also generates the shareable screen recording 710 from the screen recording session 706 to include only the media content output at the extended display device 702, but without including any personal content 136 that may be associated with the user of the device and output at the wireless device 102. The content control module 134 filters out the personal content 136 so that the shareable screen recording 144 includes one or more of the digital image content 114, the notifications 118, the audio data 122, and the external audio content 126, and is generated for uninterrupted playback without the personal content.

In implementations, the content control module 134 can generate the private screen recording 708 and the shareable screen recording 710 as the screen recording session 706 is in progress, during post-processing after the recordings are generated, or some combination thereof. Notably, when the shareable screen recording 710 is shared, such as via any number of the available social media platforms, the recording will not include any personal content 136 that is associated with the user of the wireless device.

Figure 8:
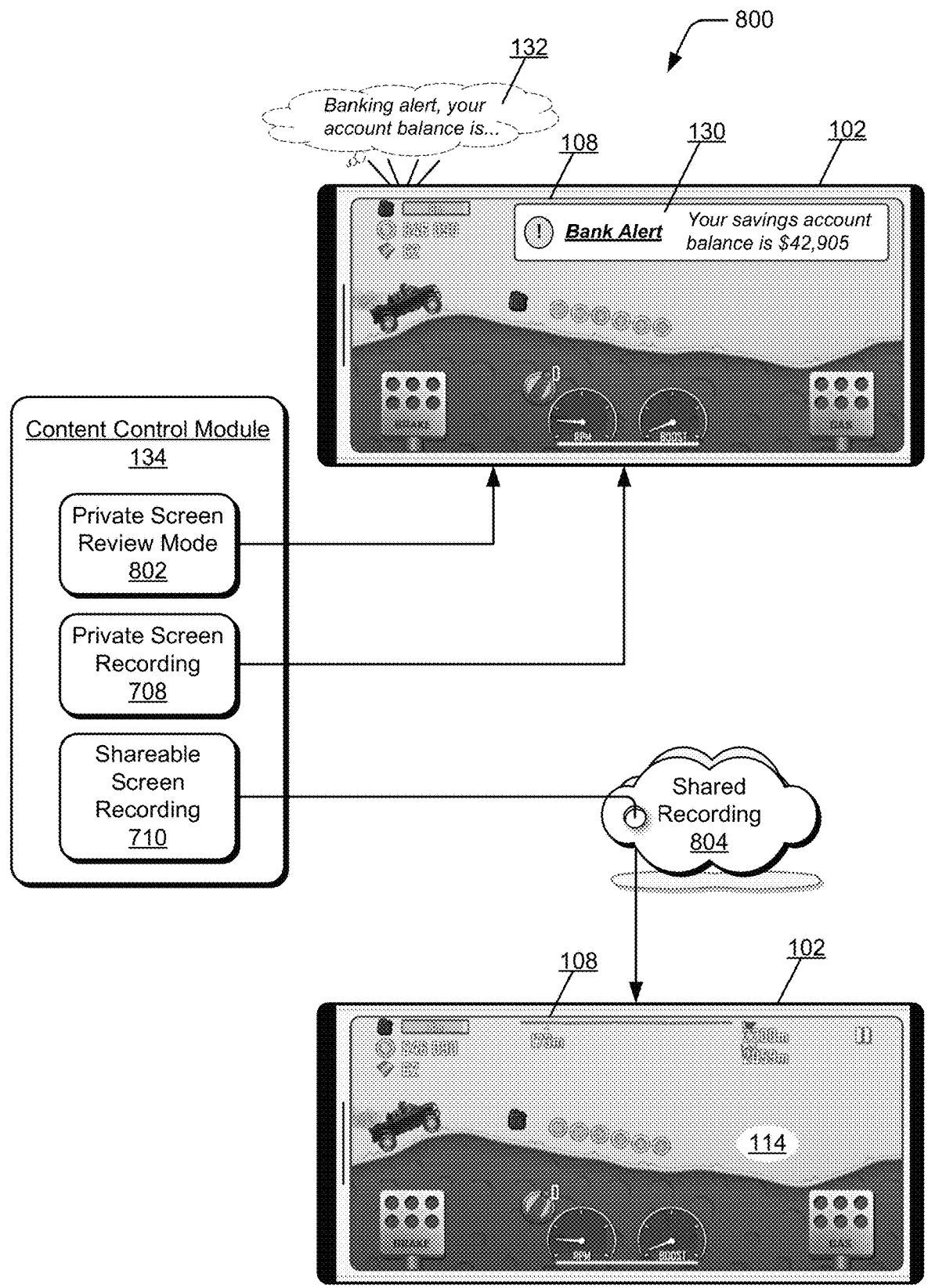
FIG. 8 illustrates examples of features for personal content managed during extended display screen recording using a wireless device in accordance with one or more implementations as described herein.

FIG. 8 further illustrates examples 800 of aspects and features for personal content managed during extended display screen recording, as described herein, such as using the wireless device 102 as shown and described with reference to FIG. 7. As shown in this example, the content control module 134 implemented by the wireless device 102 can initiate a private screen review mode 802, as well as generate the private screen recording 708 and the shareable screen recording 710. In the private screen review mode 802, the personal content 136 is displayable on the display screen 108 of the wireless device 102, but is prevented from visual display on the extended display device. For example, the "bank alert" notification 130 shown as the received banner notification displays on the display screen 108 of the wireless device 102, but is not communicated or provided as part of the digital image content for display on the extended display device. Further, as noted above, the private screen recording 708 is generated based on the media content output at the wireless device 102, to include the personal content 136. The user of the wireless device can review the private screen recording 708 on his or her device, including the personal content 136, such as the notification 130 that displays on the display screen 108 of the device and the audible announcement 132 that is emitted as audio from a speaker system of the device.

Additionally, the shareable screen recording 710 is generated by the content control module 134, excluding the personal content 136 so as not to reveal the personal content that is associated with the user of the device after the recording is uploaded (e.g., to the "cloud") and shared on social media as a shared recording 804 for others to view. For example, the content control module 134 can generate the shareable screen recording 710 to include the digital image content and audio data without any personal content 136 of the user of the wireless device 102.

Figure 9:
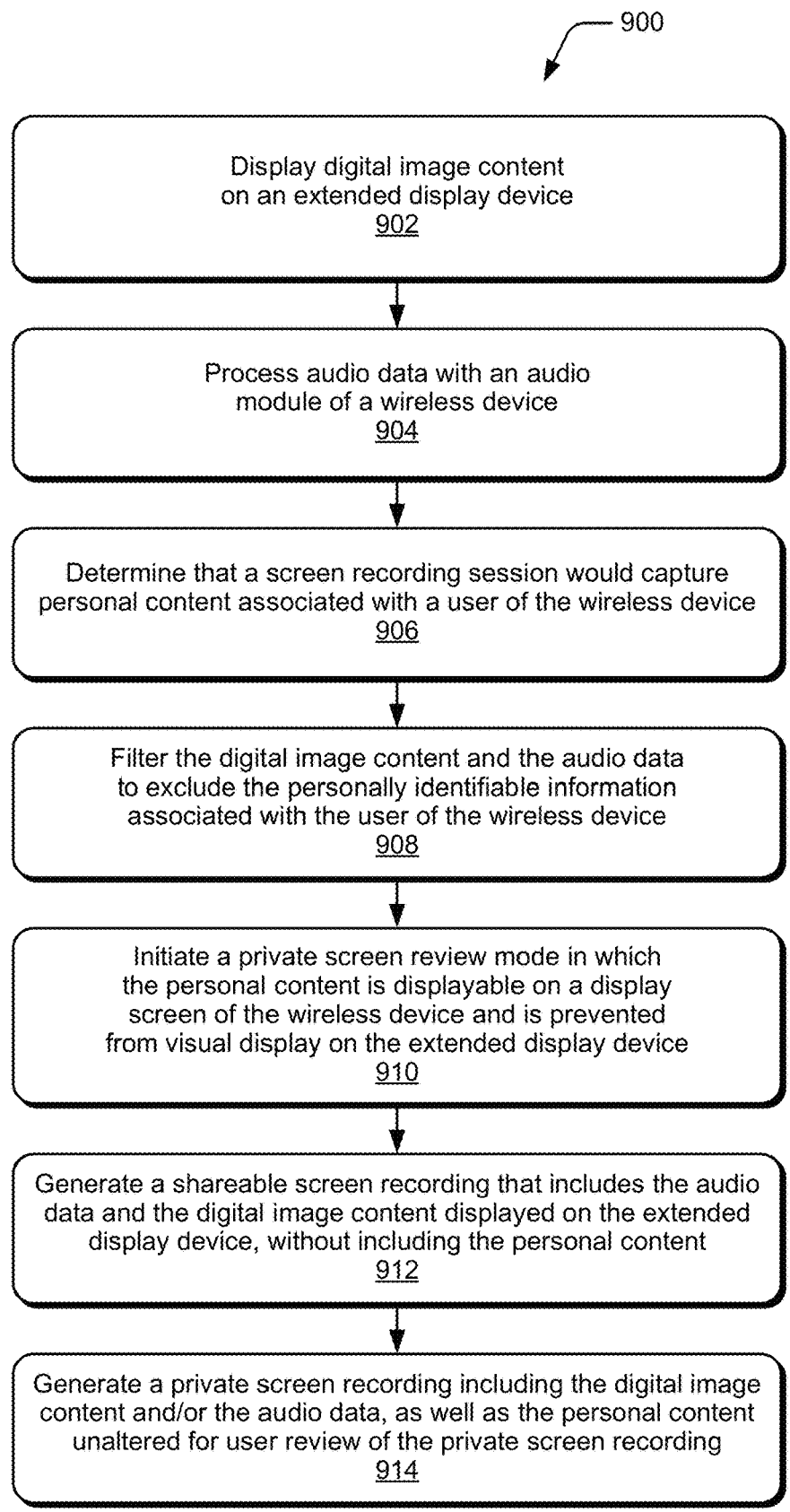
FIGS. 9-12 illustrate example methods of personal content managed during extended display screen recording in accordance with one or more implementations of the techniques described herein.

FIG. 9 illustrates example method(s) 900 of personal content managed during extended display screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 902, digital image content is displayed on an extended display device. For example, the wireless device 102 provides the digital image content 704 for display on the extended display device 702. The extended display feature provides that the digital image content 114, which is displayed on the display screen 108 of the wireless device, is also provided for display as the digital image content 704 displayed on the extended display device 702. Generally, an application user interface, or any other type of video, image, graphics, and the like is digital image content 114 that is displayable on the extended display device 702.

At 904, audio data is processed with an audio module of a wireless device. For example, the audio module 120 of the wireless device 102 processes the audio data 122 on the wireless device, such as the audio data generated by the device applications 110 in conjunction with the associated digital image content 114. For example, the gaming application that generates the user interface 112 displayed on the display screen 108 of the wireless device also generates the audio data 122 that is associated with the display of the gaming user interface. Generally, the gaming user interface 112 and the corresponding audio data 122 of the gaming application are rendered together by an audio and/or video processing system of the wireless device, such as described with reference to the example device shown in FIG. 13.

At 906, a determination is made that a screen recording session would capture personal content associated with a user of the wireless device. For example, the content control module 134 implemented by the wireless device monitors to determine that the screen recording session 706 would capture personal content 136 associated with the user of the device, where the personal content 136 would be included as part of the media content streams 138 of the various media and data streams in the device, such as the digital image content 114, the notifications 118, the audio data 122, and/or the external audio content 126. The content control module 134 can differentiate personal content from non-personal content, and identify the personal content 136 that is associated with the user as any type of personally identifiable information (PII) from the non-disclose information list 140.

At 908, the digital image content and the audio data are filtered to exclude the personally identifiable information associated with the user of the wireless device. For example, the content control module 134 implemented by the wireless device 102 filters the digital image content 114 and the audio data 122 (to include the notifications 118 and/or the external audio content 126) so as to exclude any personally identifiable information associated with the user of the wireless device.

At 910, a private screen review mode is initiated, where the personal content is displayable on a display screen of the wireless device and is prevented from visual display on the extended display device. For example, the content control module 134 implemented by the wireless device 102 can initiate a private screen review mode to generate a private screen recording 708 and filter the digital image content 114 and the audio data 122 to exclude the personal content 136 (e.g., personally identifiable information) associated with the user of the wireless device. In the private screen review mode, the personal content 136 is displayable on the display screen 108 of the wireless device 102, but is prevented from visual display on the extended display device 702. For example, the "bank alert" notification 130 shown as the received banner notification that displays on the display screen 108 of the wireless device 102 is not communicated or provided as part of the digital image content 114 for display on the extended display device 702 as part of the displayed digital image content 704. Additionally, the audible announcement 132 of the "bank alert" notification is not extended for playback by a speaker system of the extended display device 702 (or to any other external speaker system). Only the wireless device 102 displays an incoming notification 118 and/or emits an audio output from the audio data 122 that may contain personal content 136 of the user of the device.

At 912, a shareable screen recording is generated that includes the audio data and the digital image content displayed on the extended display device, without including the personal content. For example, the content control module 134 implemented by the wireless device 102 generates the shareable screen recording 710 from the screen recording session 706 to include only the media content output at the extended display device 702, but without including any personal content 136 that may be associated with the user of the device and output at the wireless device 102. The content control module 134 filters out the personal content 136 so that the shareable screen recording 144 includes one or more of the digital image content 114, the notifications 118, the audio data 122, and the external audio content 126, and is generated for uninterrupted playback without the personal content.

At 914, a private screen recording is generated that includes the digital image content and/or the audio data, as well as the personal content unaltered for user review of the private screen recording. For example, the content control module 134 implemented by the wireless device 102 generates the private screen recording 708 to include one or more of the digital image content 114, the notifications 118, the audio data 122, and the external audio content 126, as well as the personal content 136 unaltered or unfiltered for user review of the private screen recording.

Figure 10:
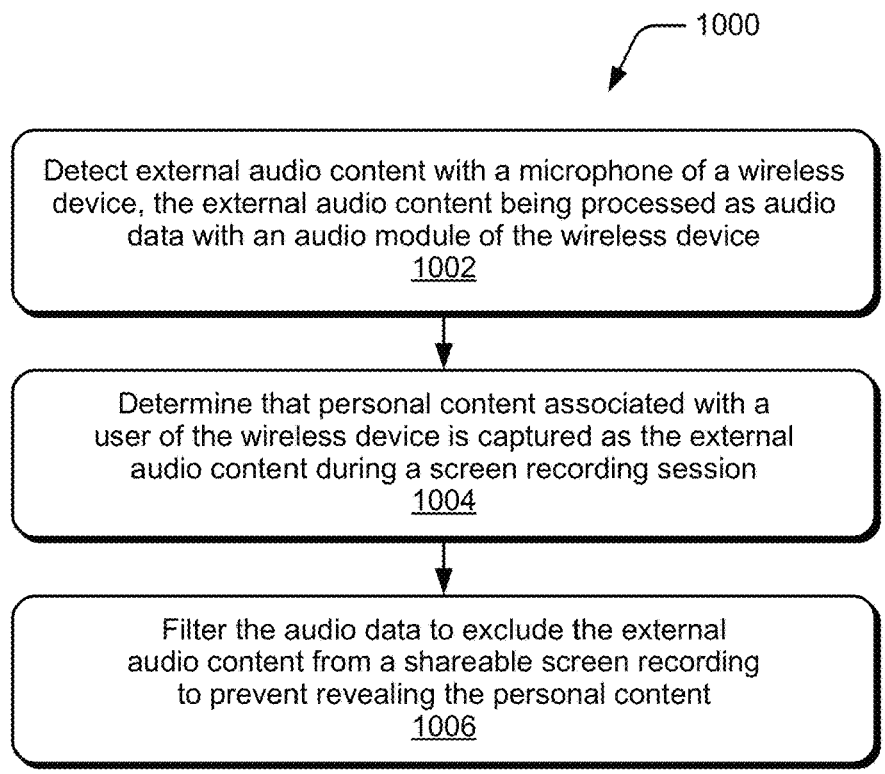

FIG. 10 illustrates example method(s) 1000 of personal content managed during extended display screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 1002, external audio content is detected with a microphone of a wireless device, the external audio content being processed as audio data with an audio module of the wireless device. For example, the microphone 124 of the wireless device 102 detects the external audio content 126, which is captured and processed as part of the audio data 122 by the audio module 120 of the device. For example, a speaker system of the wireless device may emit audio, such as music, a speaker's voice, or other types of audio, and the microphone can pick-up the audio emitted from the speaker system of the device. Similarly, the microphone may detect and pick-up other sounds and voices in the environment in which the wireless device is being used, and the external audio content 126 from the environment is processed as part of the audio data 122 by the audio module 120.

At 1004, a determination is made that personal content associated with a user of the wireless device is captured as the external audio content during a screen recording session. For example, the content control module 134 implemented by the wireless device 102 determines that personal content 136 associated with the user of the wireless device 102 would be captured as the external audio content 126 during the screen recording session 128. The microphone 124 can pick-up the external audio content 126, which is processed by the audio module 120 in the device during the screen recording session. For example, the user may have the wireless device 102 set to audibly read out notifications that are received by the device, which are then picked-up as external audio content 126 by the microphone 124 of the device, and may contain personal content of the user captured in the recording during the screen recording session 128.

At 1006, the audio data is filtered to exclude the external audio content from a shareable screen recording to prevent revealing the personal content. For example, the content control module 134 implemented by the wireless device 102 filters the audio data 122 so as to exclude the external audio content 126 from the shareable screen recording to prevent revealing the personal content 136 associated with the user of the wireless device.

Figure 11:
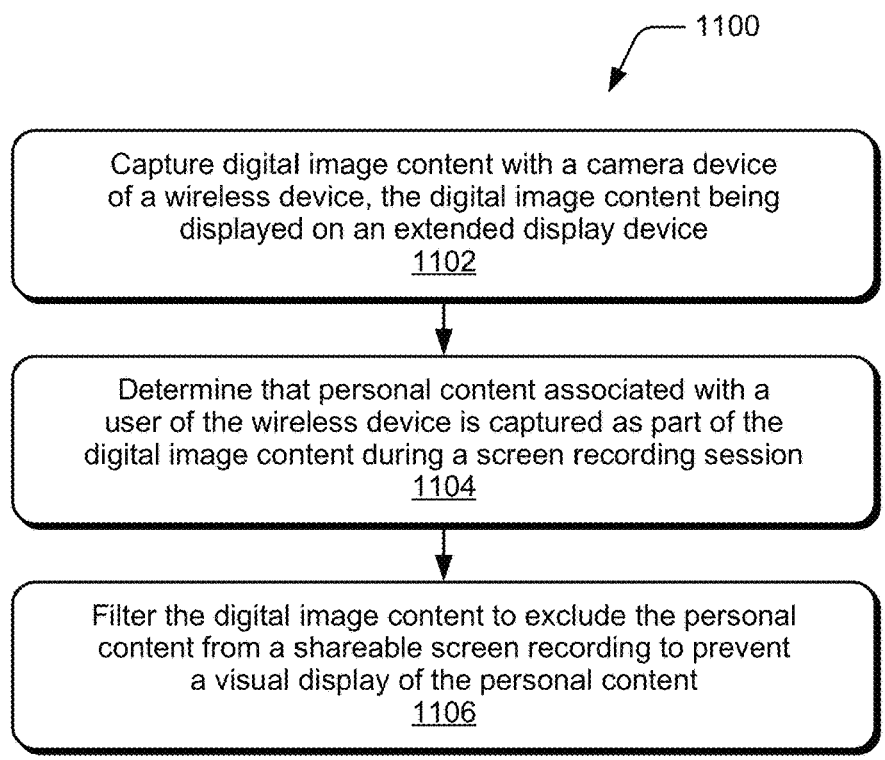

FIG. 11 illustrates example method(s) 1100 of personal content managed during extended display screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 1102, digital image content is captured with a camera device of a wireless device, the digital image content being displayed on an extended display device. For example, the camera device 116 of the wireless device 102 captures the digital image content 114 that is displayed on the display screen 108 of the wireless device and extended for display as the digital image content 704 displayed on the extended display device 702. The camera device 116 may be a front-facing camera, a rear-facing camera, or multiple camera devices, and can be utilized to capture still images and/or video, which is displayable on the display screen 108 of the wireless device and on the extended display device 702.

At 1104, a determination is made that personal content associated with a user of the wireless device is captured as part of the digital image content during a screen recording session. For example, the content control module 134 implemented by the wireless device 102 determines that personal content 136 associated with the user of the wireless device 102 would be captured as part of the digital image content 114 during the screen recording session 128. When activated, the camera device 116 may capture personal content 136 associated with the user of the wireless device as part of the digital image content 114 that is displayed on the display screen 108 of the wireless device and extended for display on the extended display device 702.

At 1106, the digital image content is filtered to exclude the personal content from a shareable screen recording to prevent a visual display of the personal content. For example, the content control module 134 implemented by the wireless device 102 filters the digital image content 114 so as to exclude the digital image content from the shareable screen recording to prevent revealing the personal content 136 associated with the user of the wireless device.

Figure 12:
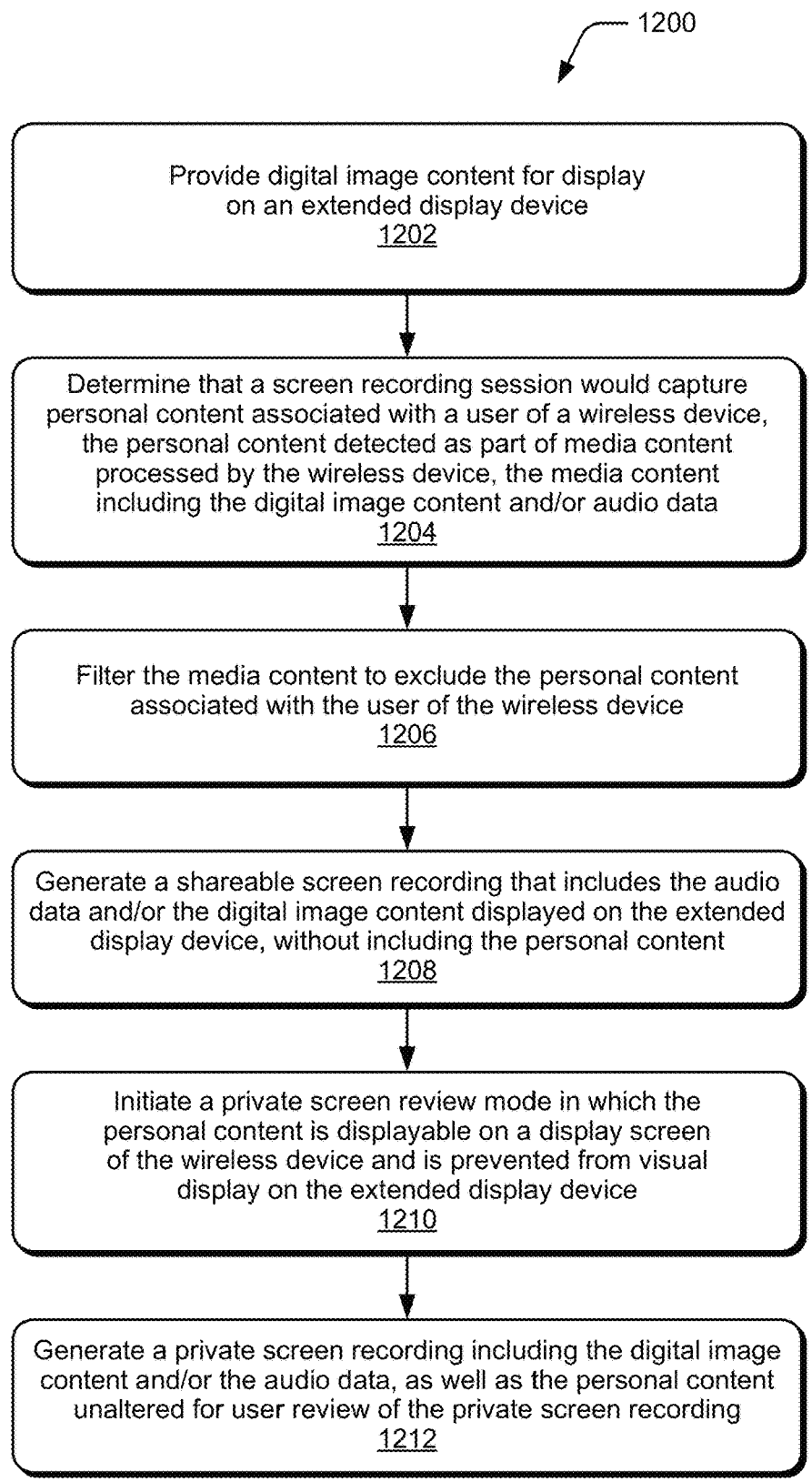

FIG. 12 illustrates example method(s) 1200 of personal content managed during extended display screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 1202, digital image content is provided for display on an extended display device. For example, the wireless device 102 provides the digital image content 704 as media content for display on the extended display device 702.

At 1204, a determination is made that a screen recording session would capture personal content associated with a user of a wireless device, the personal content detected as part of media content processed by the wireless device, the media content including the digital image content and/or audio data. For example, the content control module 134 implemented by the wireless device monitors to determine that the screen recording session 706 would capture personal content 136 associated with the user of the device, where the personal content 136 would be included as part of the media content streams 138 of the various media and data streams in the device, such as the digital image content 114, the notifications 118, the audio data 122, and/or the external audio content 126. The content control module 134 can differentiate personal content from non-personal content, and identify the personal content 136 that is associated with the user as any type of personally identifiable information (PII) from the non-disclose information list 140.

At 1206, the media content is filtered to exclude the personal content associated with the user of the wireless device. For example, the content control module 134 implemented by the wireless device 102 filters the media content so as to exclude any personally identifiable information associated with the user of the wireless device.

At 1208, a shareable screen recording is generated and includes the audio data and/or the digital image content displayed on the extended display device, without including the personal content. For example, the content control module 134 implemented by the wireless device 102 generates the shareable screen recording 710 from the screen recording session 706 to include only the media content output at the extended display device 702, but without including any personal content 136 that may be associated with the user of the device and output at the wireless device 102. The content control module 134 filters out the personal content 136 so that the shareable screen recording 144 includes the media content, and is generated for uninterrupted playback without the personal content.

At 1210, a private screen review mode is initiated, where the personal content is displayable on a display screen of the wireless device and is prevented from visual display on the extended display device. For example, the content control module 134 implemented by the wireless device 102 can initiate a private screen review mode to generate a private screen recording 708 and filter the media content to exclude the personal content 136 (e.g., personally identifiable information) associated with the user of the wireless device. In the private screen review mode, the personal content 136 is displayable on the display screen 108 of the wireless device 102, but is prevented from visual display on the extended display device 702.

At 1212, a private screen recording is generated and includes the digital image content and/or the audio data, as well as the personal content unaltered for user review of the private screen recording. For example, the content control module 134 implemented by the wireless device 102 generates the private screen recording 708 to include one or more of the digital image content 114, the notifications 118, the audio data 122, and the external audio content 126, as well as the personal content 136 unaltered or unfiltered for user review of the private screen recording.

Figure 13:
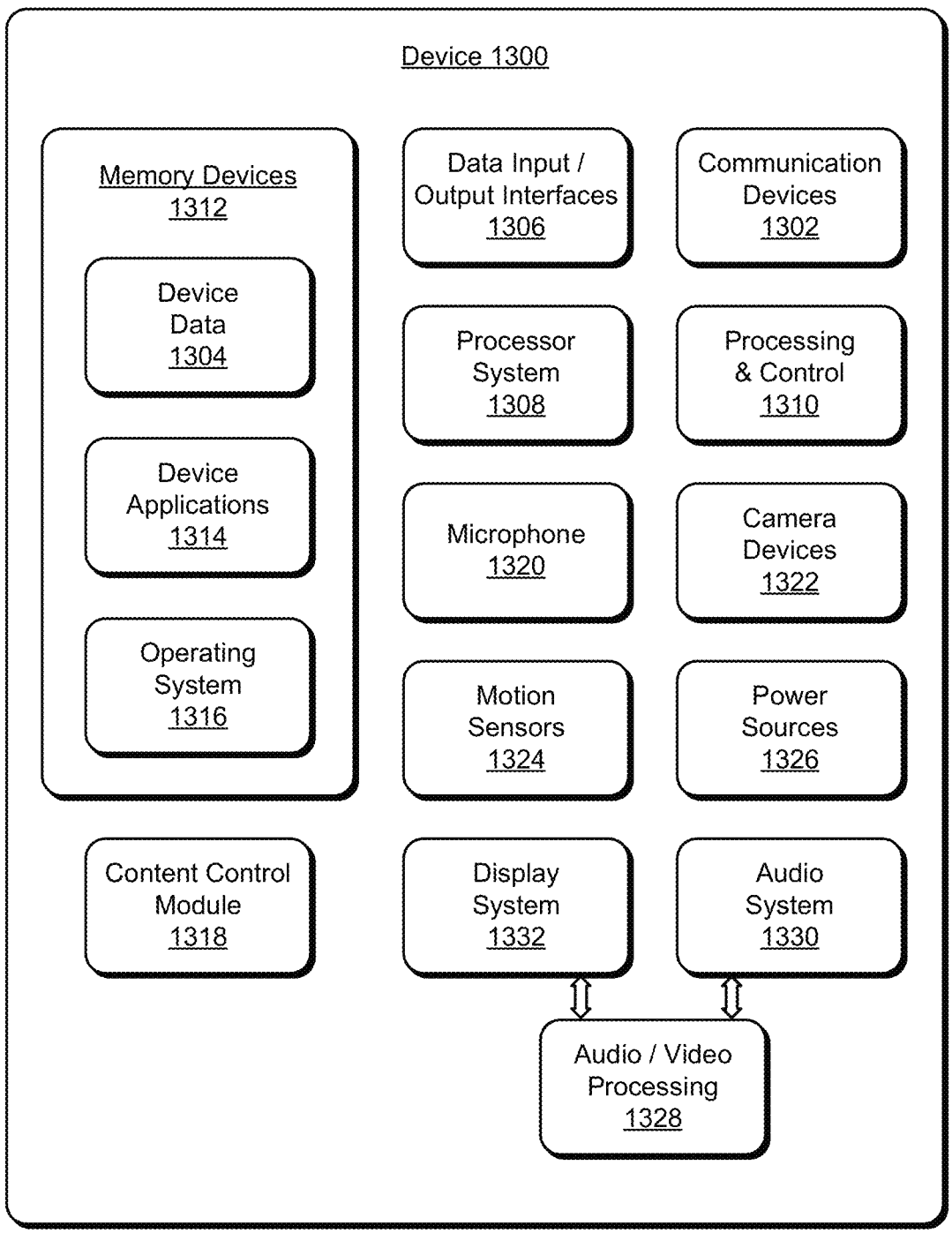
FIG. 13 illustrates various components of an example device that can be used to implement the techniques for personal content managed during screen recording as described herein.

FIG. 13 illustrates various components of an example device 1300, which can implement aspects of the techniques and features for personal content managed during screen recording, as described herein. The example device 1300 can be implemented as any of the devices described with reference to the previous FIGS. 1-12, such as any type of a wireless device, mobile device, mobile phone, flip phone, client device, companion device, paired device, display device, tablet, computing, communication, entertainment, gaming, media playback, and/or any other type of computing and/or electronic device. For example, the wireless device 102 described with reference to FIGS. 1-12 may be implemented as the example device 1300.

The example device 1300 can include various, different communication devices 1302 that enable wired and/or wireless communication of device data 1304 with other devices. The device data 1304 can include any of the various devices data and content that is generated, processed, determined, received, stored, and/or transferred from one computing device to another, and/or synched between multiple computing devices. Generally, the device data 1304 can include any form of audio, video, image, graphics, and/or electronic data that is generated by applications executing on a device. The communication devices 1302 can also include transceivers for cellular phone communication and/or for any type of network data communication.

The example device 1300 can also include various, different types of data input/output (I/O) interfaces 1306, such as data network interfaces that provide connection and/or communication links between the devices, data networks, and other devices. The I/O interfaces 1306 can be used to couple the device to any type of components, peripherals, and/or accessory devices, such as a computer input device that may be integrated with the example device 1300. The I/O interfaces 1306 may also include data input ports via which any type of data, information, media content, communications, messages, and/or inputs can be received, such as user inputs to the device, as well as any type of audio, video, image, graphics, and/or electronic data received from any content and/or data source.

The example device 1300 includes a processor system 1308 of one or more processors (e.g., any of microprocessors, controllers, and the like) and/or a processor and memory system implemented as a system-on-chip (SoC) that processes computer-executable instructions. The processor system may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1310. The example device 1300 may also include any type of a system bus or other data and command transfer system that couples the various components within the device. A system bus can include any one or combination of different bus structures and architectures, as well as control and data lines.

The example device 1300 also includes memory and/or memory devices 1312 (e.g., computer-readable storage memory) that enable data storage, such as data storage devices implemented in hardware that can be accessed by a computing device, and that provide persistent storage of data and executable instructions (e.g., software applications, programs, functions, and the like). Examples of the memory devices 1312 include volatile memory and non-volatile memory, fixed and removable media devices, and any suitable memory device or electronic data storage that maintains data for computing device access. The memory devices 1312 can include various implementations of random-access memory (RAM), read-only memory (ROM), flash memory, and other types of storage media in various memory device configurations. The example device 1300 may also include a mass storage media device.

The memory devices 1312 (e.g., as computer-readable storage memory) provide data storage mechanisms, such as to store the device data 1304, other types of information and/or electronic data, and various device applications 1314 (e.g., software applications and/or modules). For example, an operating system 1316 can be maintained as software instructions with a memory device and executed by the processor system 1308 as a software application. The device applications 1314 may also include a device manager, such as any form of a control application, software application, signal-processing and control module, code that is specific to a particular device, a hardware abstraction layer for a particular device, and so on.

In this example, the device 1300 includes a content control module 1318 that implements various aspects of the described features and techniques for personal content managed during screen recording. The content control module 1318 can be implemented with hardware components and/or in software as one of the device applications 1314, such as when the example device 1300 is implemented as the wireless device 102 described with reference to FIGS. 1-12. An example of the content control module 1318 includes the content control module 134 that is implemented by the wireless device 102, such as a software application and/or as hardware components in the wireless device. In implementations, the content control module 1318 may include independent processing, memory, and logic components as a computing and/or electronic device integrated with the example device 1300.

The example device 1300 can also include a microphone 1320 and/or camera devices 1322, as well as motion sensors 1324, such as may be implemented as components of an inertial measurement unit (IMU). The motion sensors 1324 can be implemented with various sensors, such as a gyroscope, an accelerometer, and/or other types of motion sensors to sense motion of the device. The motion sensors 1324 can generate sensor data vectors having three-dimensional parameters (e.g., rotational vectors in x, y, and z-axis coordinates) indicating location, position, acceleration, rotational speed, and/or orientation of the device. The example device 1300 can also include one or more power sources 1326, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 1300 can also include an audio and/or video processing system 1328 that generates audio data for an audio system 1330 and/or generates display data for a display system 1332. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1300. Alternatively, the audio system and/or the display system are external, peripheral components to the example device.

Although implementations of personal content managed during screen recording have been described in language specific to features and/or methods, the appended claims are not necessarily limited to the specific features or methods described. Rather, the specific features and methods are disclosed as example implementations of personal content managed during screen recording, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A screen recording system, comprising: an extended display device to display digital image content received for display; a wireless device configured to provide the digital image content for display on the extended display device, the wireless device including a screen recording session to capture the digital image content and audio data; a content control module implemented at least partially in hardware and configured to: determine that the screen recording session would capture personal content associated with a user of the wireless device; initiate a private screen review mode in which the personal content is displayable on a display screen of the wireless device and is prevented from visual display on the extended display device; and generate a shareable screen recording that includes the audio data and the digital image content displayed on the extended display device, without including the personal content, the shareable screen recording generated for uninterrupted playback.

Alternatively or in addition to the above described screen recording system, any one or combination of: the content control module is configured to generate a private screen recording including one or more of the digital image content and the audio data, as well as the personal content unaltered for user review of the private screen recording. The content control module is configured to identify the personal content as a type of personally identifiable information from a non-disclosable information list. The content control module is configured to filter the digital image content and the audio data to exclude the personally identifiable information associated with the user of the wireless device. The wireless device includes a microphone to detect external audio content that is processed as the audio data, and wherein the content control module is configured to: determine that the personal content is captured as the external audio content during the screen recording session; and filter the audio data to exclude the external audio content from the shareable screen recording to prevent revealing the personal content. The wireless device includes a camera device to capture the digital image content that is displayed on the extended display device, and wherein the content control module is configured to: determine that the personal content is captured as part of the digital image content during the screen recording session; and filter the digital image content to exclude the personal content from the shareable screen recording to prevent a visual display of the personal content. The digital image content captured by the camera device is displayable on the display screen of the wireless device in the private screen review mode.

A method, comprising: displaying digital image content on an extended display device; processing audio data with an audio module of a wireless device that provides the digital image content for display on the extended display device; determining that a screen recording session would capture personal content associated with a user of the wireless device; initiating a private screen review mode in which the personal content is displayable on a display screen of the wireless device and is prevented from visual display on the extended display device; and generating a shareable screen recording that includes the audio data and the digital image content displayed on the extended display device, without including the personal content, the shareable screen recording generated for uninterrupted playback.

Alternatively or in addition to the above described method, any one or combination of: generating a private screen recording including one or more of the digital image content and the audio data, as well as the personal content unaltered for user review of the private screen recording. The further comprising identifying the personal content as a type of personally identifiable information from a non-disclosable information list. The method further comprising filtering the digital image content and the audio data to exclude the personally identifiable information associated with the user of the wireless device. The method further comprising: detecting external audio content with a microphone of the wireless device, the external audio content being processed as the audio data; determining that the personal content is captured as the external audio content during the screen recording session; and filtering the audio data to exclude the external audio content from the shareable screen recording to prevent revealing the personal content. The method further comprising: capturing the digital image content that is displayed on the extended display device with a camera device of the wireless device; determining that the personal content is captured as part of the digital image content during the screen recording session; and filtering the digital image content to exclude the personal content from the shareable screen recording to prevent a visual display of the personal content. The digital image content captured by the camera device is displayable on the display screen of the wireless device in the private screen review mode.

A method, comprising: providing digital image content for display on an extended display device; determining that a screen recording session would capture personal content associated with a user of a wireless device, the personal content detected as part of media content processed by the wireless device, the media content including one or more of the digital image content and audio data; and generating a shareable screen recording that includes one or more of the audio data and the digital image content displayed on the extended display device, without including the personal content.

Alternatively or in addition to the above described method, any one or combination of: initiating a private screen review mode in which the personal content is displayable on a display screen of the wireless device and is prevented from visual display on the extended display device. The method further comprising generating a private screen recording including one or more of the digital image content and the audio data, as well as the personal content unaltered for user review of the private screen recording. The method further comprising: identifying the personal content as a type of personally identifiable information from a non-disclosable information list; and filtering the media content to exclude the personally identifiable information associated with the user of the wireless device. The method further comprising: detecting external audio content with a microphone of the wireless device, the external audio content being processed as the audio data; determining that the personal content is captured as the external audio content during the screen recording session; and filtering the audio data to exclude the external audio content from the shareable screen recording to prevent revealing the personal content. The method further comprising: capturing the digital image content that is displayed on the extended display device with a camera device of the wireless device; determining that the personal content is captured as part of the digital image content during the screen recording session; and filtering the digital image content to exclude the personal content from the shareable screen recording to prevent a visual display of the personal content.

The invention claimed is:

1. A screen recording system, comprising:
a wireless device including a screen recording session to capture audio data, the wireless device including a microphone to detect external audio content that is processed as the audio data; and
a content control module implemented at least partially in hardware and configured to:
detect that the external audio content is captured by the screen recording session;
determine that the external audio content includes personal content associated with a user of the wireless device;
identify a portion of the external audio content including the personal content;
filter the portion of the external audio content including the personal content from the external audio content;
edit the audio data to mute the portion of the external audio content including the personal content to prevent revealing the personal content;
generate a private screen recording that includes the audio data including the personal content for access by a device having an authorization access level; and
generate a shareable screen recording that is different from the private screen recording and includes the audio data without including the personal content.

2. The screen recording system of claim 1, wherein the private screen recording includes the audio data with the personal content unaltered for user review of the private screen recording.

3. The screen recording system of claim 1, wherein the content control module is configured to identify the personal content as a type of personally identifiable information from a non-disclosable information list.

4. The screen recording system of claim 3, wherein the content control module is configured to filter the audio data to exclude the personally identifiable information associated with the user of the wireless device.

5. The screen recording system of claim 1, wherein the content control module is configured to generate the shareable screen recording for uninterrupted playback without including the personal content.

6. The screen recording system of claim 1, wherein the content control module is configured to initiate a private screen review mode for the private screen recording of at least the audio data including the personal content.

7. A method, comprising:
processing audio data of a screen recording session with an audio module of a wireless device;
detecting that external audio content is captured by the screen recording session;
determining that the external audio content includes personal content associated with a user of the wireless device;
identifying a portion of the external audio content including the personal content;
filtering the portion of the external audio content including the personal content from the external audio content;
editing the audio data to mute the portion of the external audio content including the personal content;
generating a private screen recording that includes the audio data including the personal content for access by a device having an authorization access level; and
generating a shareable screen recording that is different from the private screen recording and includes the audio data without including the personal content.

8. The method of claim 7,
wherein the private screen recording includes the audio data with the personal content unaltered for user review of the private screen recording.

9. The method of claim 7, further comprising:
identifying the personal content as a type of personally identifiable information from a non-disclosable information list.

10. The method of claim 7, further comprising:
initiating a private screen review mode for the private screen recording of at least the audio data including the personal content.

11. The method of claim 7, further comprising:
detecting the external audio content with a microphone of the wireless device; and
filtering the audio data to prevent revealing the personal content by excluding at least part of the external audio content from the shareable screen recording.

12. The screen recording system of claim 1, wherein the content control module is configured to generate a share authorization access level for the shareable screen recording.

13. The screen recording system of claim 2, wherein the content control module is configured to generate the authorization access level for the private screen recording.

14. The method of claim 7, wherein the shareable screen recording is generated with a share authorization access level.

15. The method of claim 7, further comprising generating the authorization access level.

16. A mobile device, comprising:
a microphone to detect external audio content that is processed as audio data of a screen recording session; and
a content control module implemented at least partially in hardware and configured to:
detect that the external audio content is captured by the screen recording session;
determine that the external audio content includes personal user content;
identify a portion of the external audio content including the personal user content;
filter the portion of the external audio content including the personal user content from the external audio content;
edit the audio data to mute the portion of the external audio content including the personal user content;
generate a private screen recording that includes the audio data including the personal user content for access by a device having an authorization access level; and
generate a shareable screen recording that is different from the private screen recording and includes the audio data without including the personal user content.

17. The mobile device of claim 16, wherein the content control module is configured to generate the shareable screen recording for uninterrupted playback without including the personal user content.

18. The mobile device of claim 16, wherein the personal user content is personally identifiable information, and the content control module is configured to filter the audio data to exclude the personally identifiable information.

19. The mobile device of claim 16, wherein the private screen recording includes the audio data with the personal user content unaltered for private user review of the private screen recording.

20. The screen recording system of claim 1, wherein the content control module is configured to detect an audible notification from the wireless device that includes the personal content.

* * * * *